United States Patent
Jang et al.

(10) Patent No.: US 10,791,210 B2
(45) Date of Patent: Sep. 29, 2020

(54) HEALTH BAND TERMINAL

(71) Applicant: LG ELECTRONICS INC., Seoul (KR)

(72) Inventors: Yujune Jang, Seoul (KR); Bongjeong Jeon, Seoul (KR); Jie Seol, Seoul (KR); Seongeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 382 days.

(21) Appl. No.: 15/713,515

(22) Filed: Sep. 22, 2017

(65) Prior Publication Data

US 2018/0109669 A1    Apr. 19, 2018

(30) Foreign Application Priority Data

Oct. 14, 2016  (KR) .......................... 10-2016-0133704

(51) Int. Cl.
| | |
|---|---|
| *G06F 17/00* | (2019.01) |
| *H04M 1/725* | (2006.01) |
| *G06Q 50/00* | (2012.01) |
| *G06Q 10/00* | (2012.01) |
| *G06F 3/0484* | (2013.01) |

(Continued)

(52) U.S. Cl.
CPC .... *H04M 1/72547* (2013.01); *G06F 3/04845* (2013.01); *G06F 3/04883* (2013.01); *G06Q 10/00* (2013.01); *G06Q 50/01* (2013.01); *G10L 15/265* (2013.01); *G10L 21/10* (2013.01); *G06F 3/0482* (2013.01); *G06F 3/04886* (2013.01); *H04M 2201/42* (2013.01); *H04M 2250/22* (2013.01)

(58) Field of Classification Search
CPC . G06F 3/04845; G06F 3/0482; G06F 3/04886
USPC .......................... 715/204, 246, 276, 788, 790
See application file for complete search history.

(56) References Cited

U.S. PATENT DOCUMENTS

| | | | |
|---|---|---|---|
| 7,689,915 B2 * | 3/2010 | Kitamaru .............. | G06F 3/0481 715/711 |
| 8,620,850 B2 * | 12/2013 | Brown .................. | G06F 17/241 463/31 |

(Continued)

FOREIGN PATENT DOCUMENTS

EP    2741243    6/2014

OTHER PUBLICATIONS

European Patent Office Application No. 17000435.2, Search Report dated Aug. 29, 2017, 7 pages.

*Primary Examiner* — Stephen S Hong
*Assistant Examiner* — Matthew J Ludwig
(74) *Attorney, Agent, or Firm* — Lee, Hong, Degerman, Kang & Waimey

(57) ABSTRACT

The present disclosure provides a mobile terminal including a wireless communication unit configured to perform wireless communication with an external device, a display unit configured to display a data input window for entering data for transmitting wireless information to the external device and screen information including a graphic image for transmitting content, and a controller configured to apply a touch to the graphic image to select different types of content and display them on the display unit, wherein the controller forms merge content consisting of the different types of content selected to be transmitted to the external device in a state that the screen information is displayed.

18 Claims, 25 Drawing Sheets

(51) Int. Cl.
*G06F 3/0488* (2013.01)
*G10L 15/26* (2006.01)
*G10L 21/10* (2013.01)
*G06F 3/0482* (2013.01)

(56) References Cited

U.S. PATENT DOCUMENTS

| | | | | |
|---|---|---|---|---|
| 8,918,339 | B2 * | 12/2014 | Rubinstein | G06Q 40/00 |
| | | | | 705/39 |
| 2010/0093325 | A1 * | 4/2010 | Jang | G06F 16/9577 |
| | | | | 455/414.2 |
| 2011/0279459 | A1 * | 11/2011 | Hohpe | G06T 11/60 |
| | | | | 345/467 |
| 2014/0118595 | A1 * | 5/2014 | Jung | G06F 3/04886 |
| | | | | 348/333.01 |
| 2015/0256568 | A1 * | 9/2015 | Osmond | H04L 67/02 |
| | | | | 715/753 |
| 2015/0372959 | A1 * | 12/2015 | Velummylum | H04L 51/18 |
| | | | | 709/206 |
| 2016/0050169 | A1 * | 2/2016 | Ben Atar | H04M 1/72544 |
| | | | | 709/206 |
| 2016/0064035 | A1 * | 3/2016 | Bostick | H04N 5/265 |
| | | | | 386/241 |
| 2016/0291822 | A1 * | 10/2016 | Ahuja | H04L 51/32 |

* cited by examiner

HEALTH BAND TERMINAL

CROSS-REFERENCE TO RELATED APPLICATION

Pursuant to 35 U.S.C. § 119(a), this application claims the benefit of earlier filing date and right of priority to Korean Patent Application No. 10-2016-0133704, filed on Oct. 14, 2016, the contents of which are all hereby incorporated by reference herein in its entirety.

BACKGROUND OF THE INVENTION

1. Field of the Invention

The present disclosure relates to a mobile terminal capable of transmitting content.

2. Description of the Related Art

A mobile terminal may include all devices provided with a battery and a display unit, and configured to display information on the display unit using power supplied from the battery, and formed to be portable by a user. The mobile terminal may include a device for recording and playing back a video, a device for displaying a graphic user interface (GUI), and also may include a notebook, a portable phone, glasses and a watch capable of displaying screen information, a gaming device, and the like.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

Various contents stored in the mobile terminal may be shared or transmitted to an external device. However, in order to select various types of contents to be transmitted, there is a drawback of passing through a complicated processes of executing different applications, selecting and editing contents through applications, and then executing a transmission application again.

SUMMARY OF THE INVENTION

Therefore, the present disclosure provides a mobile terminal capable of selecting and editing content to be attached in a state that a data transmission application for attaching content is carried out.

In order to accomplish the task of the present disclosure, there is provided a mobile terminal, including a wireless communication unit configured to perform wireless communication with an external device, a display unit configured to display a data input window for entering data for transmitting wireless information to the external device and screen information including a graphic image for transmitting content, and a controller configured to apply a touch to the graphic image to select different types of content and display them on the display unit, wherein the controller forms merge content consisting of the different types of content selected to be transmitted to the external device in a state that the screen information is displayed.

According to an example associated with the present disclosure, the different types of content may be displayed on the data input window, and merge content formed based on a specific type of touch input applied to the different types of content may be displayed on the data input window, and thus a user may merge a plurality of content to immediately transmit them to an external device without executing another application.

According to an example associated with the present disclosure, when the one content corresponds to a video file consisting of plurality of images, the controller may display the plurality of images in a first edit region, and the controller may form edit content consisting of at least part of the plurality of images based on a touch applied to the plurality of images displayed in the first edit region. Accordingly, content to be transmitted to an external device may be immediately edited and transmitted in a state that screen information is displayed without the need of editing them using an additional application.

According to an example associated with the present disclosure, in a state that one content is displayed on the display unit, the controller may control the display unit to extract and display additional content associated with specific information among the one content based on a specific type of touch input applied to the one content. Accordingly, a user may select provided content and transmit it to an external device without the need of individually searching and attaching content associated with each other.

According to the present disclosure, it may be possible to merge or edit content selected on the screen information of an application for transmitting and receiving data in a wireless manner. Accordingly, it is not required for a user to additionally activate another application for merging or editing content.

Furthermore, additional information associated with specific information included in displayed content may be provided, and thus it is not required for a user to individually search and select content associated therewith. Accordingly, it may be possible to conveniently select content to be attached.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as a digital TV, a desktop computer, a digital signage and the like, excluding a case of being applicable only to the mobile terminals.

Figure 1A:
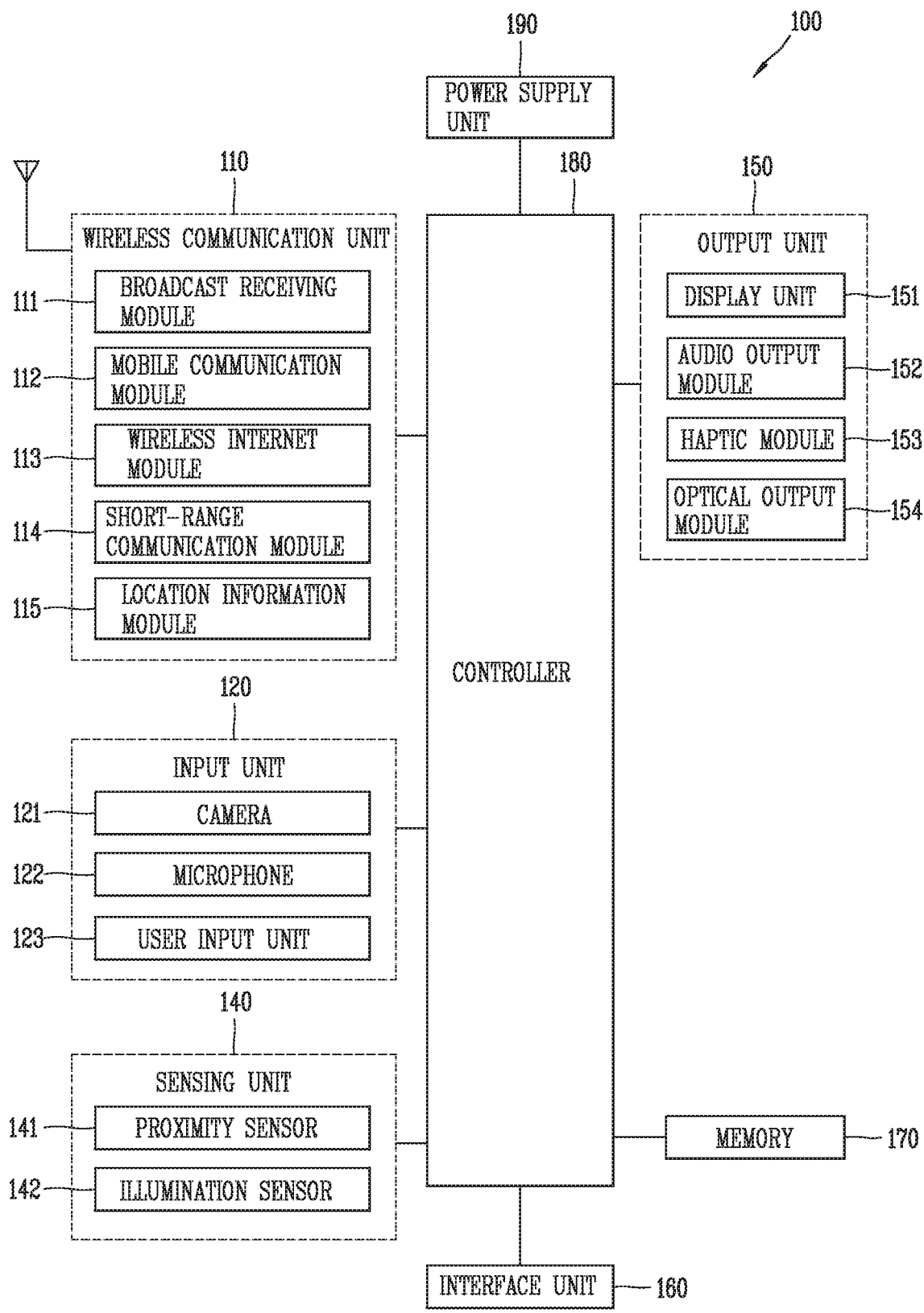
FIG. 1A is a block diagram for explaining a mobile terminal associated with the present disclosure.
Figure 1B:
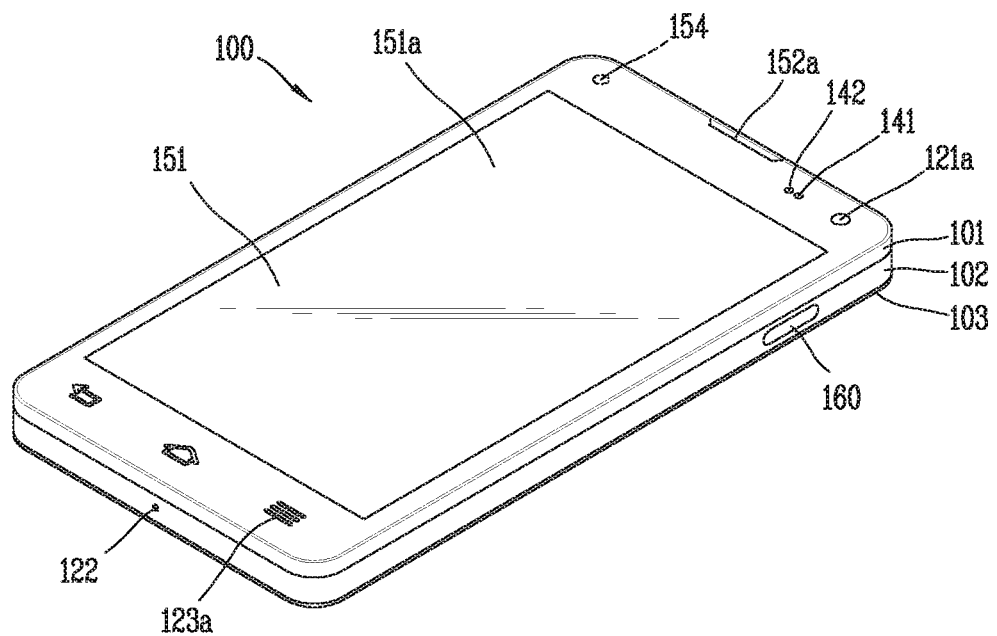
FIGS. 1B and 1C are conceptual views in which an example of a mobile terminal associated with the present disclosure is seen from different directions.
Figure 1C:
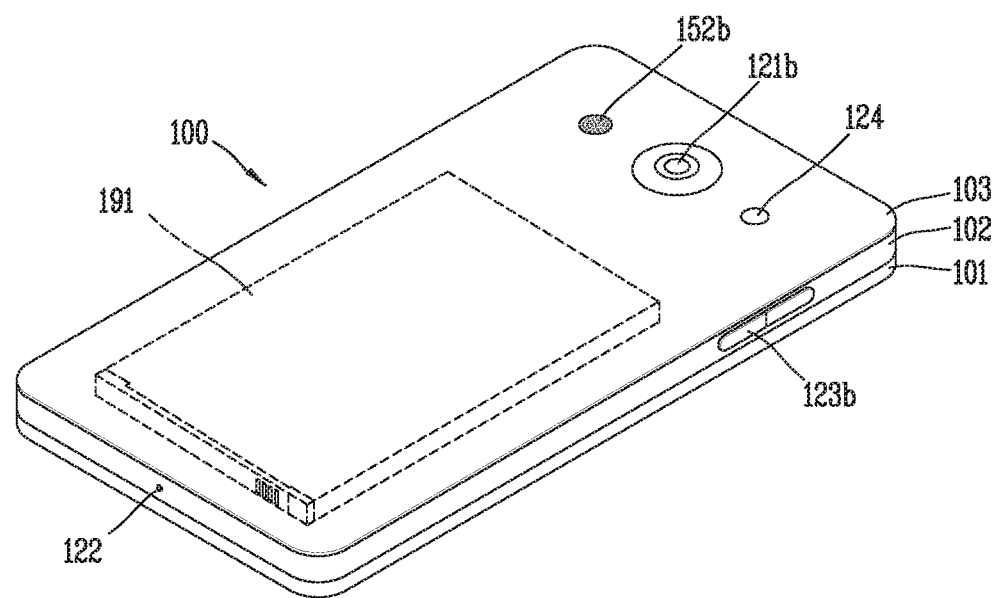

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1 illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), Long Term Evolution-Advanced (LTE-A), etc.)

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A) and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit may employ a stereoscopic display scheme such as stereoscopic scheme (a glasses scheme), an auto-stereoscopic scheme (glasses-free scheme), a projection scheme (holographic scheme), or the like.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices.

For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

A second display unit 251 is disposed on a rear surface of a terminal body according to the present disclosure. Accordingly, an additional rear camera and flash may not be disposed on a rear surface of the terminal body.

The second audio output module 152b may further be disposed on a rear surface of the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments associated with a control method which can be implemented in the mobile terminal having the foregoing configuration will be described with reference to the attached drawings. It should be understood by those skilled in the art that the present invention can be embodied in other specific forms without departing from the concept and essential characteristics thereof.

Figure 2A:
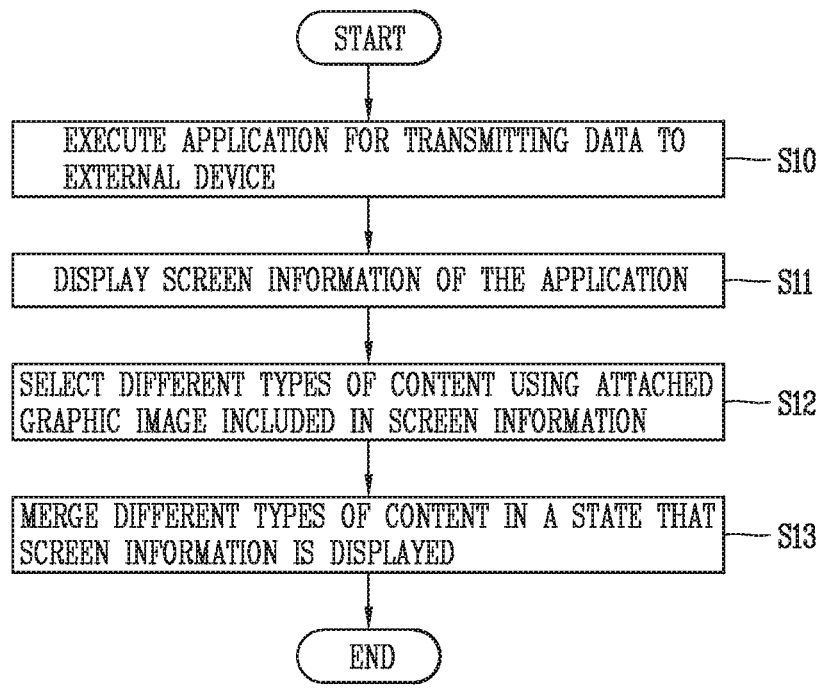
FIG. 2A is a flow chart for explaining a control method of a mobile terminal according to an embodiment of the present disclosure.
Figure 2B:
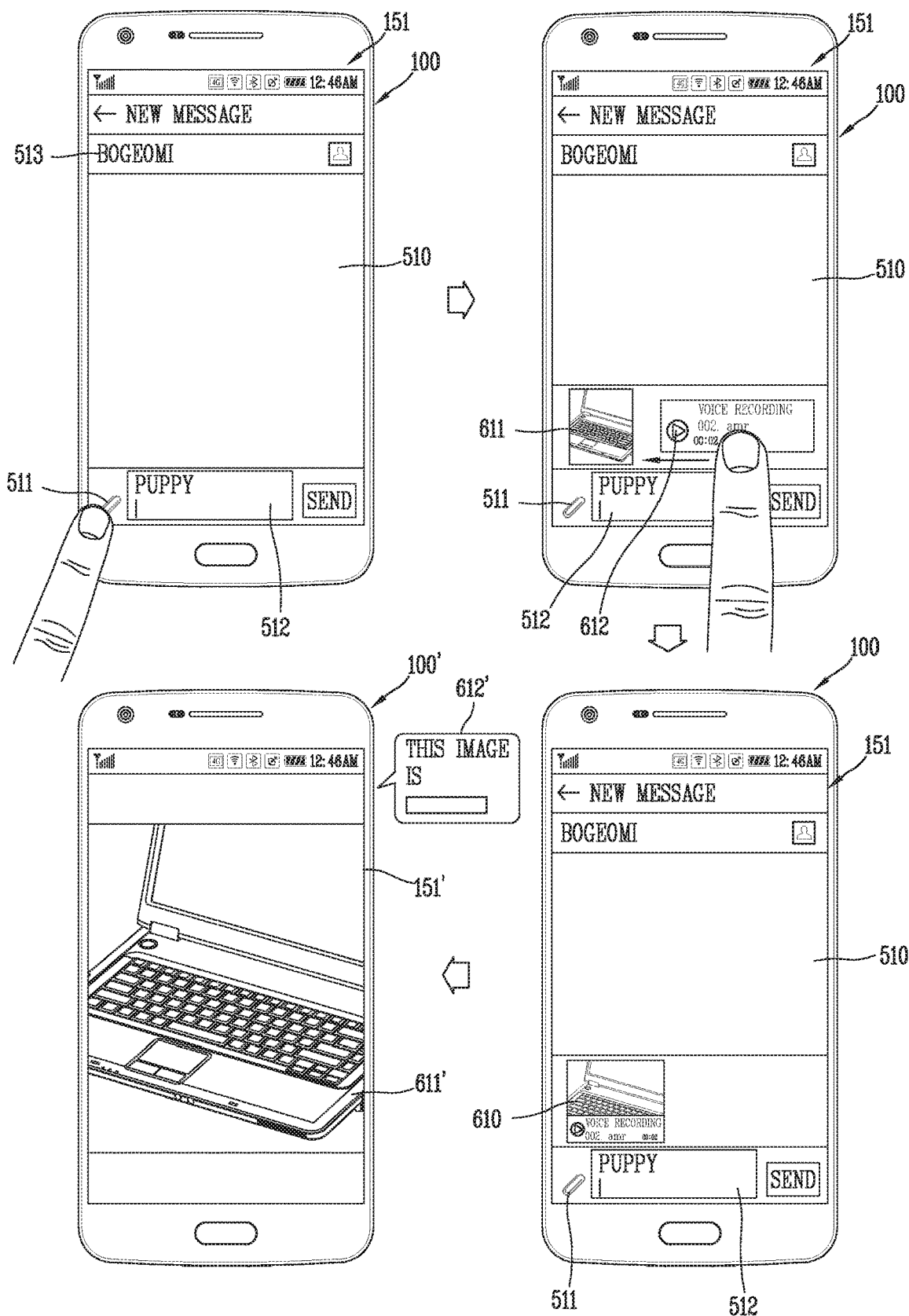
FIG. 2B is a conceptual view for explaining a method of sending the usage status of a mobile terminal.

FIG. 2A is a flow chart for explaining a control method of a mobile terminal according to an embodiment of the present disclosure, and FIG. 2B is a conceptual view for explaining a method of sending the usage status of a mobile terminal.

Referring to FIGS. 2A and 2B, the mobile terminal 100 executes an application for transmitting data to an external device based on a user's specific control method (S10). For example, the application may correspond to a message application for transmitting data entered by the user to an external device, a chatting application, or the like. When the application is carried out, the display unit 151 displays specific screen information 510 on an execution screen of the application (S11).

The screen information 510 may include an input window 513 of a receiving device for selecting the external device and displaying a representative name of the external device, a data input window 512 for displaying a text using an input device such as a virtual keyboard or the like, and a graphic image 511 for selecting an attachment file. Furthermore, the screen information 510 may further include an output region for displaying data transmitted to and received from the external device.

The controller 180 selects different types of content using the graphic image 511 (S12). Here, the different types of contents correspond to content with different display formats or different types of files. The different types of contents may correspond to two types of content among image files, music files, video files, voice recording files.

When a touch input is applied to the graphic image 511, the display unit 151 may list content that can be contained in the data to be transmitted or display application information for displaying the content. The controller 180 may select a plurality of content based on a touch applied to the display unit 151.

The display unit 151 displays a first and a second thumbnail image indicating the selected first and second content 611, 612, respectively, on the data input window 512. The first and the second thumbnail image may be formed in different shapes, and disposed in parallel. The thumbnail image may include the information of the relevant content.

The controller 180 forms merge content 610 consisting of the different types of content in a state that the screen information 510 is displayed (S13). For example, the controller 180 forms the merge content 610 based on a touch applied to the first and the second content 611, 612. When the touch input is released in a state that the first and the second content 611, 612 overlap with each other based on a dragging touch input sequentially applied to the first and the second content 611, 612, the controller 180 may form the merge content 610.

A thumbnail image of the merged content 610 is also displayed on the data input window 512. The controller 180 controls the wireless communication unit 110 to transmit the merged content 610 to a specific external device 100' based on a control command applied to the screen information 510.

For example, when the merged content 610 corresponds to image and voice information, the specific external device 100' controls the display unit 151 to display the image based on a control command for displaying the merged content 610, and controls a speaker to output voice information.

As a result, it is not required for a user to form additional content using a separate application. A touch may be applied to a thumbnail image corresponding to each content on screen information that transmits data to form merge content.

Accordingly, a user may form and transmit his or her desired combination of content without passing through a complicated process for transmitting merged content.

When the merge content is formed, the controller 180 may control it to be stored in the memory 170 so as to store it. As a result, the controller 180 may select the merge content later to transmit it to another external device.

Figure 3A:
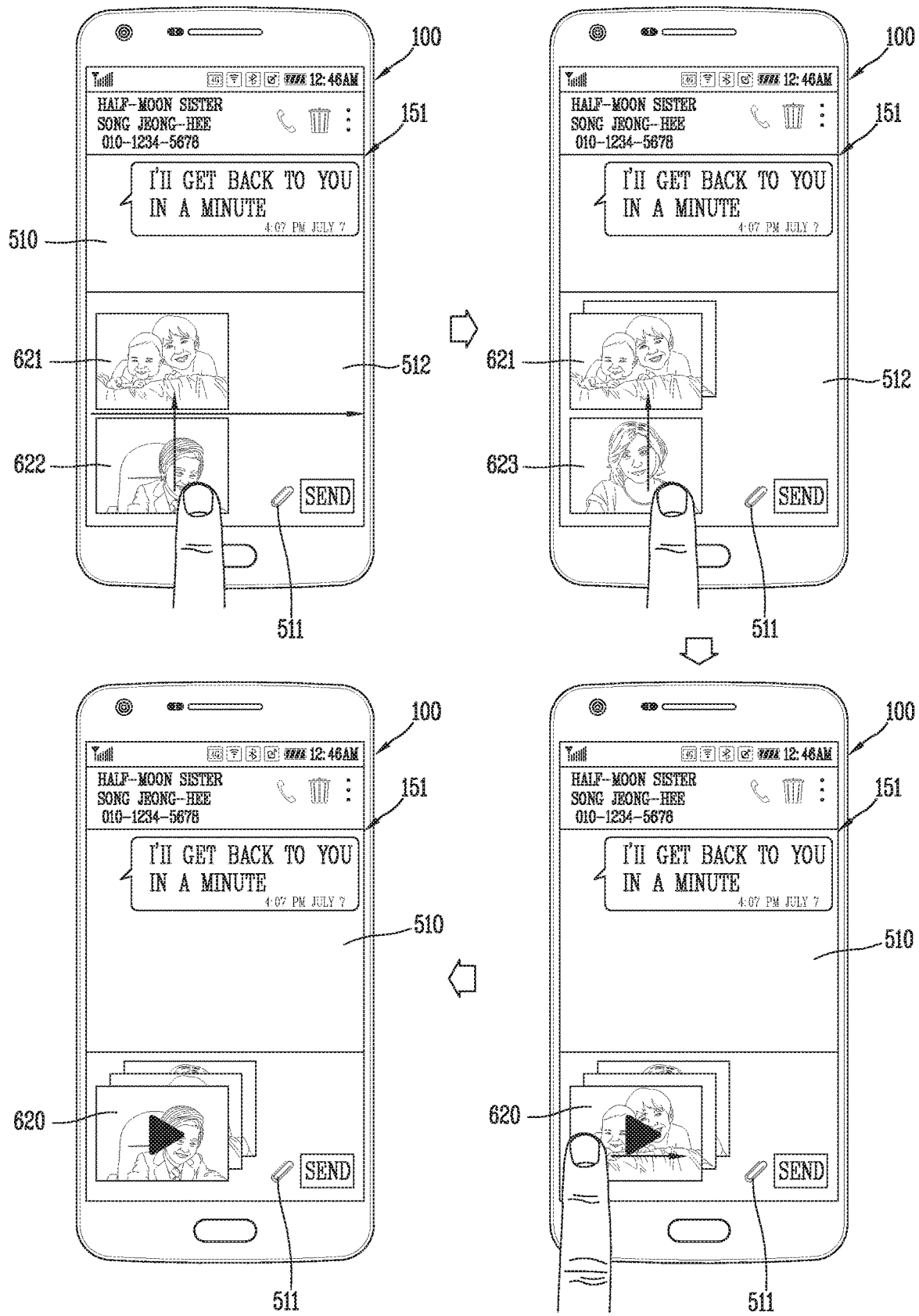
FIGS. 3A through 3C are conceptual views for explaining a merge method of content according to another embodiment.
Figure 3B:
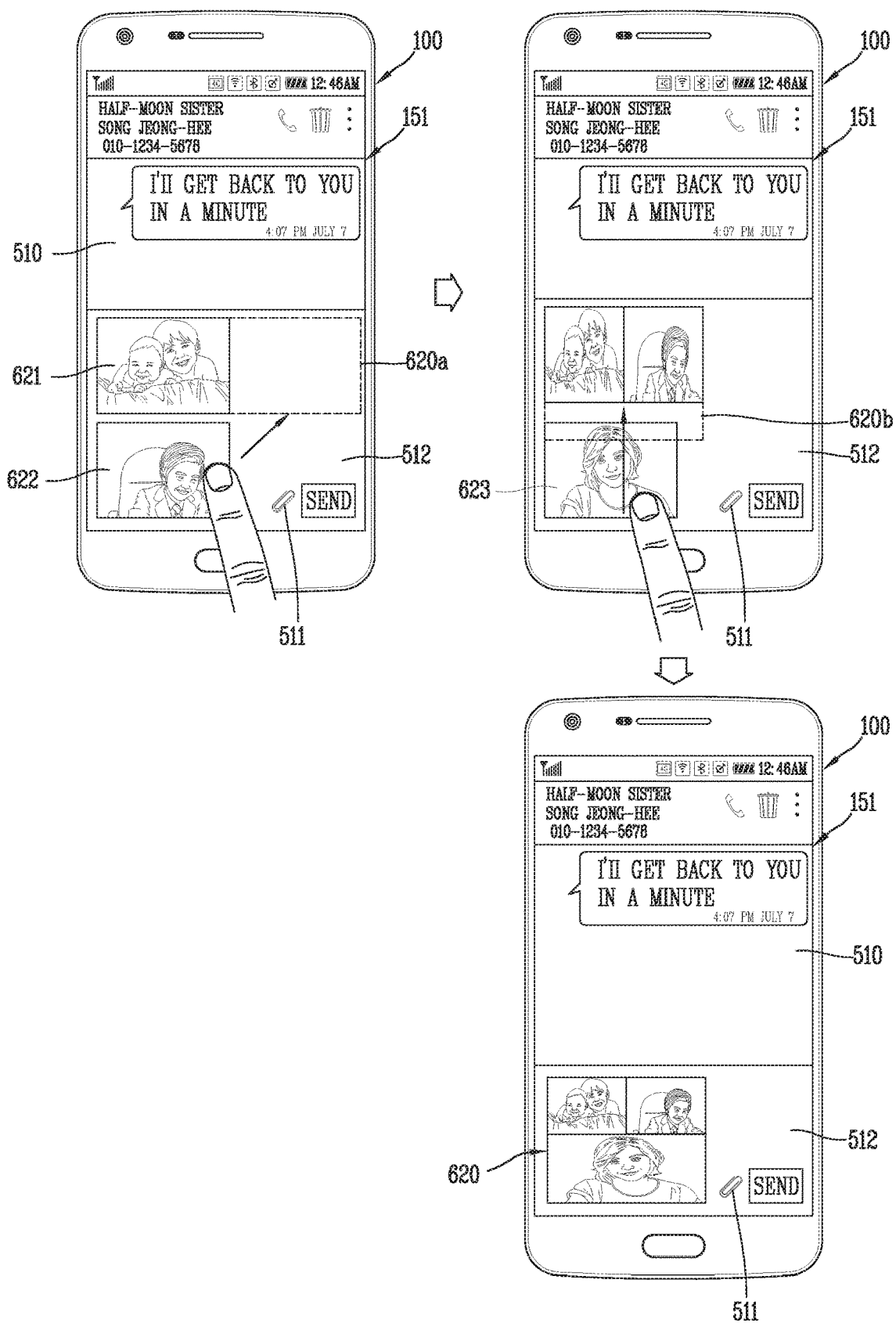
Figure 3C:
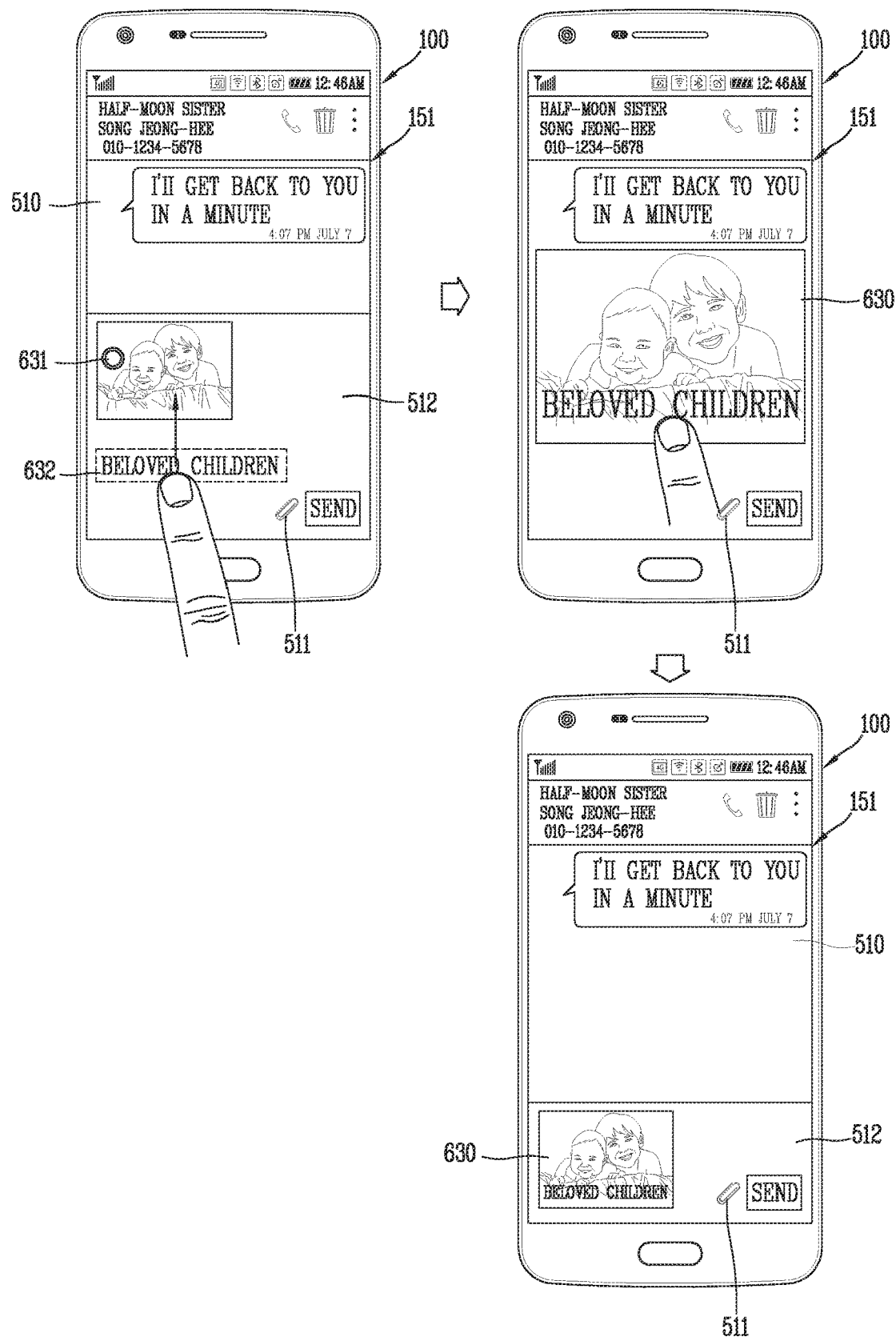

FIGS. 3A through 3C are conceptual views for explaining a merge method of content according to another embodiment.

A control method of merging the same type of content will be described with reference to FIG. 3A. A plurality of content may be selected based on a touch applied to the graphic image 511 in a state that the screen information 510 is displayed. For an example, the content may correspond to images. The plurality of selected images are displayed on the data input window 512. Only part of the plurality of images may be displayed on the data input window 512. For example, when three content are selected, the display unit 151 may selectively display only first and second content 621, 622 on the data input window 512.

The controller 180 forms merge content to sequentially display the first and the second content 621, 622 according to the passage of time based on a consecutive touch input (for example, a dragging type of touch input) sequentially applied to the first and the second content 621, 622. When the first and the second content 621, 622 are merged to be one file, the remaining content are displayed on the data input window 512. When the third content 623 is displayed, merge content 620 in which the first through the third content 621, 622, 623 are merged is formed based on a touch input consecutively applied to the third content 623 and merge content.

The second region 620 may correspond to a slide show type content in which the first through the third content 621, 622, 623 are sequentially displayed according to the passage of time. The sequence of displaying the first through the third content 621, 622, 623 may be changed based on a touch input applied to a thumbnail image indicating the second region 620.

An external device that has received the second region 620 may apply a touch to a playback image to sequentially display the plurality of content.

According to the present embodiment, a user may change a plurality of images to a different type of merge content displayed according to the passage of time to provide it to the external device. In order to form the plurality of images in a different type of content, an edit application of the image may not be implemented again, but carried out only using the data input window 512.

A control method of forming one merge image with a plurality of images. will be described with reference to FIG. 3B.

The display unit 151 displays a plurality of content selected by applying a touch to the graphic image 511 on the data input window 512. The graphic image 511 may be displayed on the data input window 512 for only part of the plurality of content.

When a touch is applied to the second content 622 in a state that the first and the second content 621, 622 are displayed on the data input window 512, a first guide image 620a for forming merge content is displayed. The first guide image 620a may correspond to a composite region of the second content 622 to form the merge content in the one image format. The first guide image 620a is formed adjacent to one edge of the first content 621.

When a touch input applied to the second content 622 is moved and released onto the first guide image 620a, the first and the second content 621, 622 are combined to form one content. The first guide image 620a guides the position of the first and the second content 621, 622 when first merge content is formed with the first and the second content 621, 622.

On the other hand, third content 623 is displayed at the same time in a state that one merge content is displayed on the data input window 512 of the screen information 510 by the first and the second content 621, 622. The third content 623 may correspond to one selected together with the first and the second content 621, 622 or selected subsequent to additionally applying a touch input to the graphic image 511.

When a touch input is applied to the third content 623, a second guide image 620b is displayed one edge of the first merge content. Second merge content 620 is formed based on a touch input applied to the third content 623 and then moved. The touch input may correspond to a touch input initially applied to the third content 623 and released from the second guide image 620b.

The first through the third content 621, 622, 623 may be formed in a size of one content, but the present disclosure may not be necessarily limited to this. It may be formed in a size equal to a sum of the capacities of the first through the third content 621, 622, 623. Though not shown in detail in the drawing, the controller 180 may perform an edit operation of enlarging, reducing or cutting one region of each content based on a user's control command.

According to the present embodiment, a user may transmit each content one by one or form merge content in which a plurality of content are combined on the screen information of one application.

Referring to FIG. 3C, when a touch input for entering a text is received, the display unit 151 may display a virtual keyboard. The controller 180 displays second content 632 in a text format on the data input window 512 based on a touch applied to the virtual keyboard. Furthermore, the controller 180 displays a different type of first content 631 from that of the second content 632 based on a touch input applied to the graphic image 511. For example, the first content 631 may correspond to an image stored in the memory 170.

The controller 180 forms merge content 630 in which the first and the second content 631, 632 are combined based on a touch input applied to the second content 632. For example, the display unit 151 may select at least part of the second content 632 based on a specific type of touch input (for example, a long touch input applied for a specific period of time) applied to the second content 632, and display it.

When a touch input initially applied to the second content 632 is moved and released onto the first content 631, the merge content 630 in which the second content 632 is displayed in one region of the first content 631 is formed. The one region may be set by a released region of the touch input. The merge content 630 may be formed in an image format including a text.

When the merge content 630 is formed, the display unit 151 may display the merge content 630 in an enlarged format in one region of the screen information 310. The controller 180 may edit the merge content 630 based on a touch input applied in a state that the merge content 630 is displayed on the screen information 310. For example, the controller 180 may change the position of the second content 632 or delete or modify the second content 632 on the first content 631.

The controller 180 controls the display unit 151 to display the merge content 630 again on the data input window 512 based on a specific type of touch input applied to the merge content 630.

As a result, a user may combine an entered text with another content on the screen information 310 to transmit new merge content to an external device.

Figure 4:
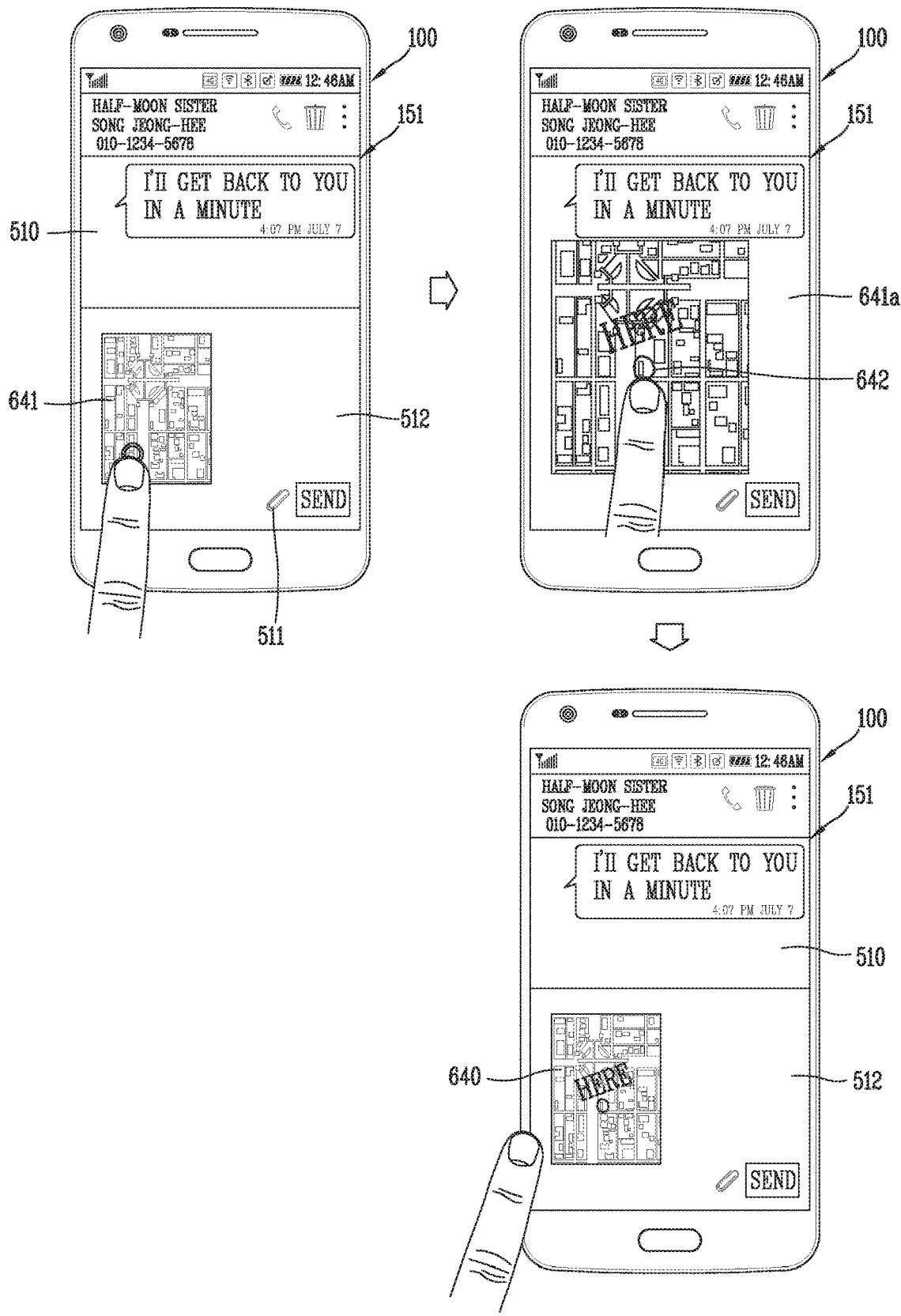
FIG. 4 is a view for explaining a control method of adding a handwriting input to content to form merge content according to another embodiment.

FIG. 4 is a view for explaining a control method of adding a handwriting input to content to form merge content according to another embodiment.

Referring to FIG. 4, the controller 180 controls the display unit 151 to select first content 641 based on a touch applied to the graphic image 511, and display it on the data input window 512.

For example, the first content 641 may correspond to an image including map information, an activation image of a specific application including map information, and the like.

The controller 180 controls the display unit 151 to switch the first content 641 to an edit state based on a specific type of touch input applied to the first content 641, and display an edit screen 641*a* including the first content 641.

The display unit 151 displays a handwriting image 642 on the first content 641 based on a touch applied to the edit screen 641*a*. The handwriting image 642 is formed along a path of the touch. Though not shown in detail in the drawing, tool menus for displaying the handwriting image may be displayed on the edit screen 641*a*.

The controller 180 controls the display unit 151 to form merge content 640 including the handwriting image 642, and display the merge content 640 on the data input window 512 when a specific type of touch input is applied to the merge content 640.

As a result, a user may apply a touch input to specific content to form a handwriting image, and transmit merge content including the handwriting image. Accordingly, it is not required for a user to activate an additional edit application to add a handwriting image.

On the drawing, the first content is illustrated in an image, but it may be possible to form merge content in which a handwriting image is merged to one image constituting a video file in which images are sequentially displayed according to the passage of time.

Figure 5A:
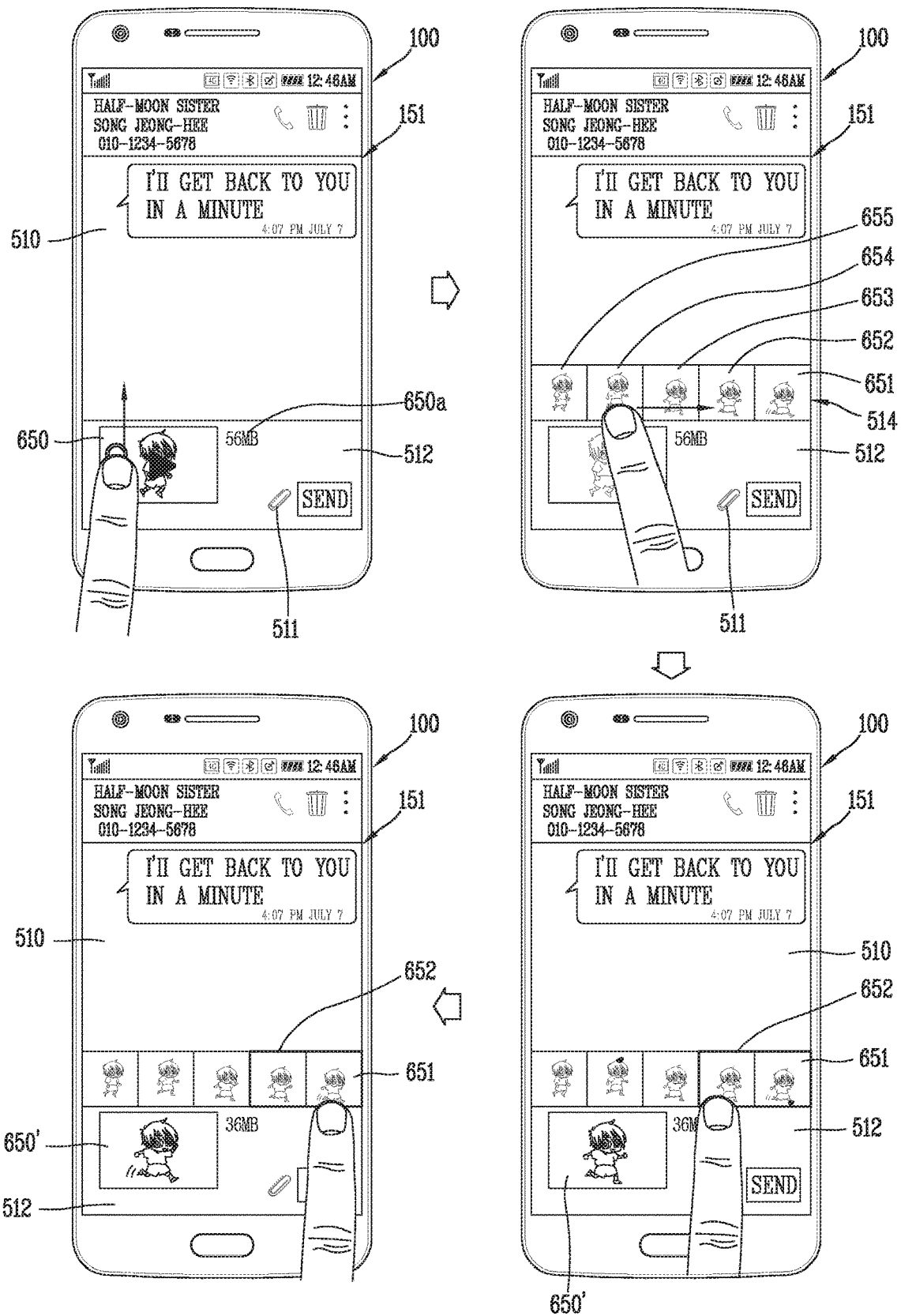
FIGS. 5A through 5C are conceptual views for explaining a control method of editing selected content on screen information according to still another embodiment.
Figure 5B:
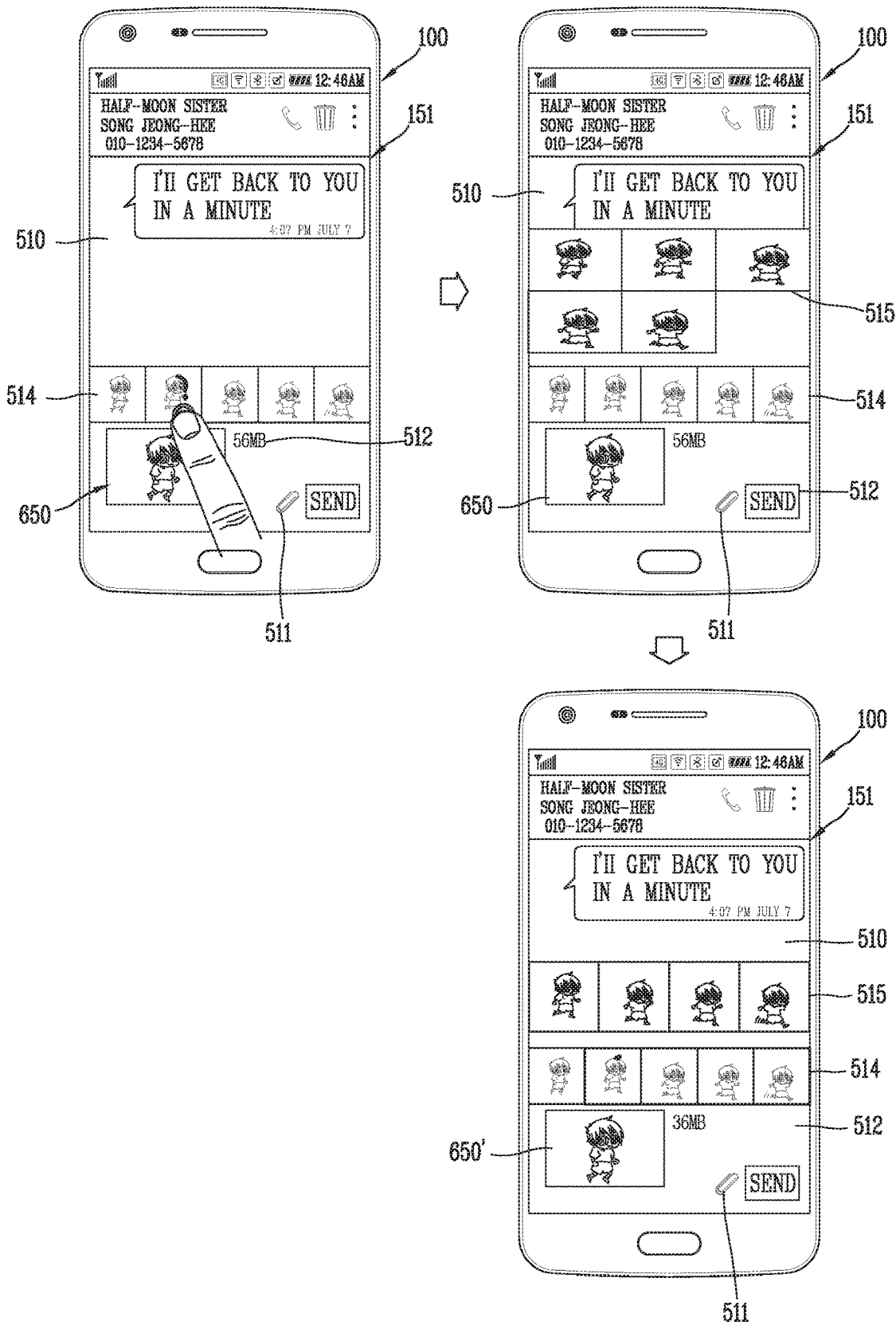
Figure 5C:
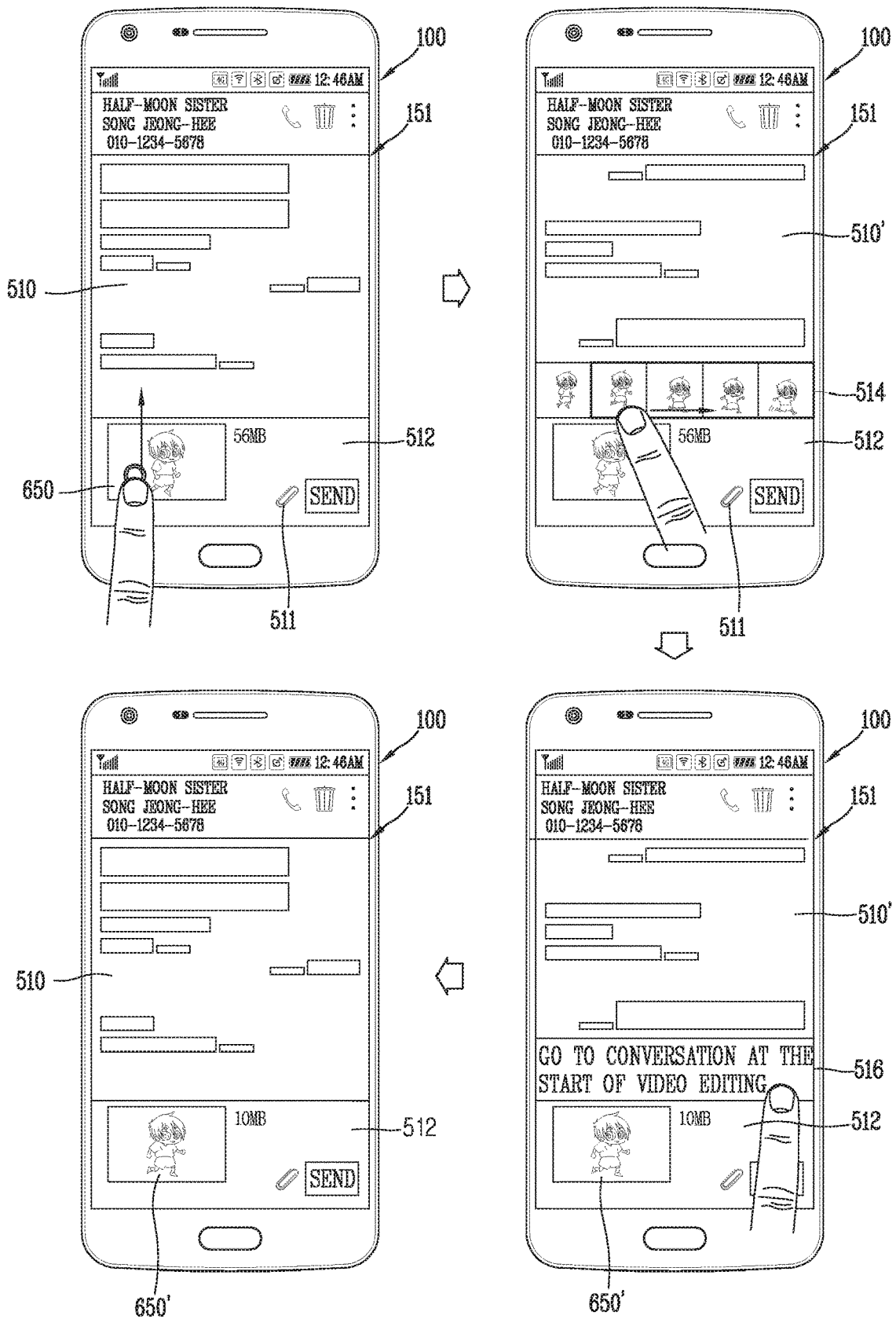

FIGS. 5A through 5C are conceptual views for explaining a control method of editing selected content on screen information according to still another embodiment.

Referring to FIG. 5A, the controller 180 controls the touch screen to select content 650 and display a thumbnail image corresponding to the content 650 on the data input window 512 based on a touch input applied to the graphic image 511. The controller 180 controls the display unit 151 to display lower information 651, 652, 653, 654, 655 included in the content 650 on an edit region 514 based on a touch input applied to the content 650 displayed on the data input window 512.

For example, when the content 650 corresponds to a video file including images displayed according to the passage of time, the lower information 651, 652, 653, 654, 655 may correspond to at least part of a plurality of images included in the video file.

The controller 180 may edit the content 650 based on a touch input applied to the edit region 514. For example, the touch input may correspond to a dragging type of touch consecutively applied to at least part of the plurality of listed images. For example, the controller 180 may form an edit content 650' consisting of only corresponding images from an initially applied touch region to a region from which a touch is released. In this case, the edit content 650' is formed to be smaller than the capacity of the content 650.

The display unit 151 may display the content 650 and the capacity of the edit content 650' at the same time. As a result, it may not be required for a user to activate an additional application to form the edit content, and change the capacity of an attachment file.

On the other hand, a thumbnail image indicating the edit content 650' may correspond to one of a plurality of images included in the edit content 650'. The controller 180 may change a thumbnail image indicating the edit content 650' based on a touch applied to the edit region 514 indicating images consisting of the edit content 650'.

Referring to FIG. 5B, when a specific type of touch is applied to the edit region 514 in a state that a plurality of images are displayed on the edit region 514, the controller 180 forms an extended edit region 515. The upper plate 51 may be formed in a larger area than that of the edit region 514, and formed in one region of the screen information 510.

The display unit 151 enlarges a plurality of images, respectively, displayed in the edit region 514 to display them on the extended edit region 515. As a result, a user may check the images in a further extended state. The controller 180 may form edit content 650' based on a touch input applied to the images on the extended edit region 515, and change a size of each image displayed on the extended edit region 515 when a number of images is increased or decreased by editing.

According to the present embodiment, a user may more easily edit content through an edit region formed in one region within a region of the screen information 510 and an extended edit region.

Referring to FIG. 5C, sent and received data (text, image, etc.) are listed according to the passage of time on the screen information 510. Wirelessly transmitted and received data are listed, and recently transmitted and received messages are selectively displayed on current screen information 510.

While wirelessly transmitted and received data are sequentially displayed according to the passage of time on the screen information 510, the controller 180 may edit the content 650 based on a touch input applied to the content 650 displayed on the data input window 512.

When a touch is applied to the content 650, the edit region 514 is displayed on the screen information 510. The controller 180 edits the content 650 based on a touch input applied to the edit region 514, and continuously displays data transmitted and received by the wireless communication unit 110 on the screen information 510 while editing the content 650. As a result, the screen information 510 may be converted into modified screen information 510' including other data.

On the other hand, when the editing of the content 650 is ended, the display unit 151 deletes the edit region 514, and displays a control image 516. When a touch is applied to the control image 516, screen information 510 at the time of forming the edit region 514 is displayed again. The control image 516 may include a text indicating moving to previous conversation, but the present disclosure may not be necessarily limited to this, and may be formed with a specific image or figure.

As a result, a user may recheck data that has not been checked while editing content.

Figure 6:
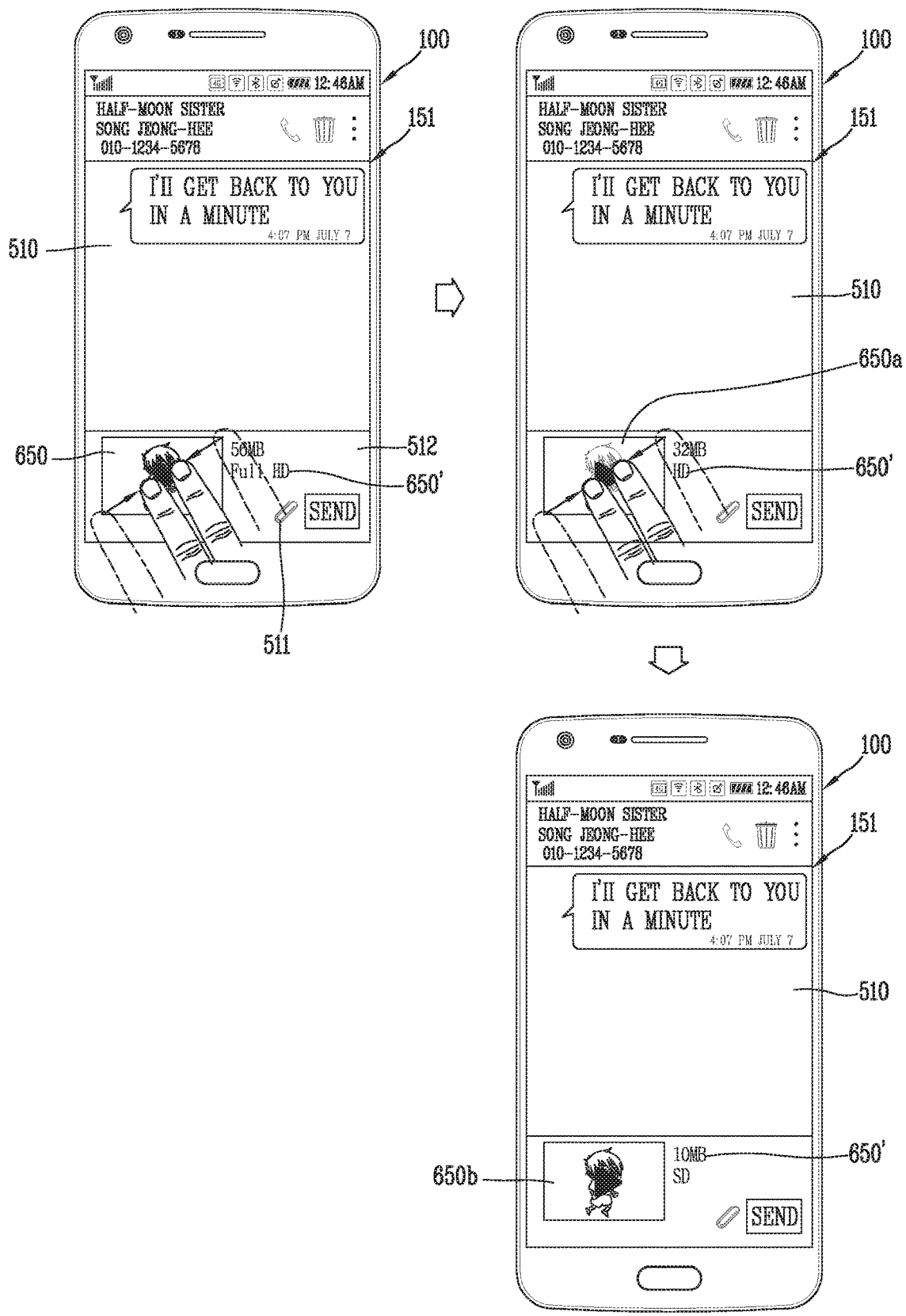
FIG. 6 is a conceptual view for explaining a control method for changing the display status of content according to another embodiment.

FIG. 6 is a conceptual view for explaining a control method for changing the display status of content according to another embodiment.

Referring to FIG. 6, the display unit 151 displays the content 650 and the playback information (Full HD) 650' of the content 650 on the data input window 512. The controller 180 displays first change content 650a in which the playback information is changed based on a touch applied to the content 650, and forms second change content 650b based on the touch input applied in a repeated manner. The display unit 151 may display the playback information 650' of the first and the second change content 650a, 650b on the data input window 512 to notify the changed playback information to a user.

On the other hand, a specific type of touch input applied to the content 650 may correspond to a pinch-in or pinch-out type of touch input.

Figure 7A:
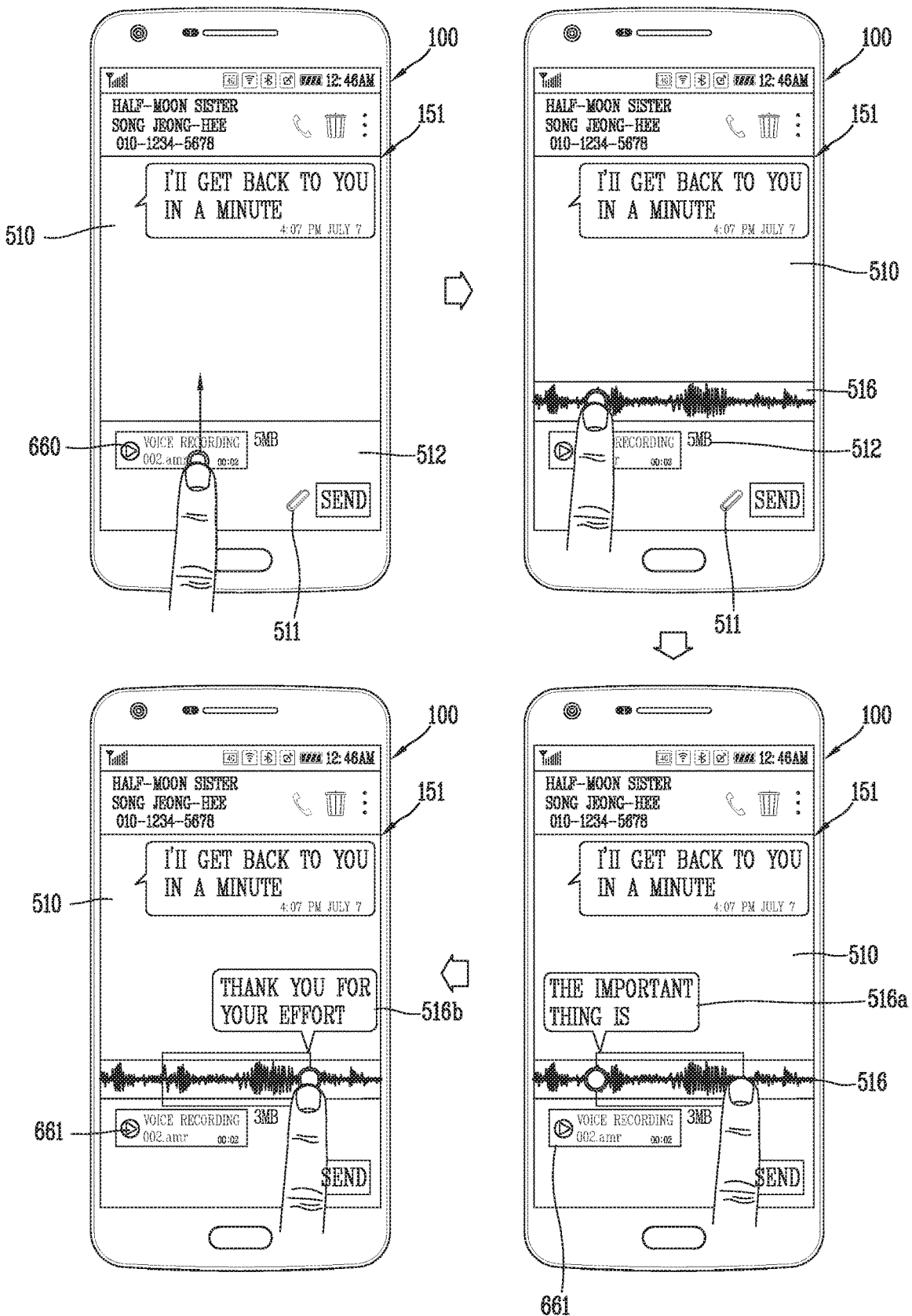
FIGS. 7A through 7C are conceptual views for explaining a control method of editing auditory content according to another embodiment.
Figure 7B:
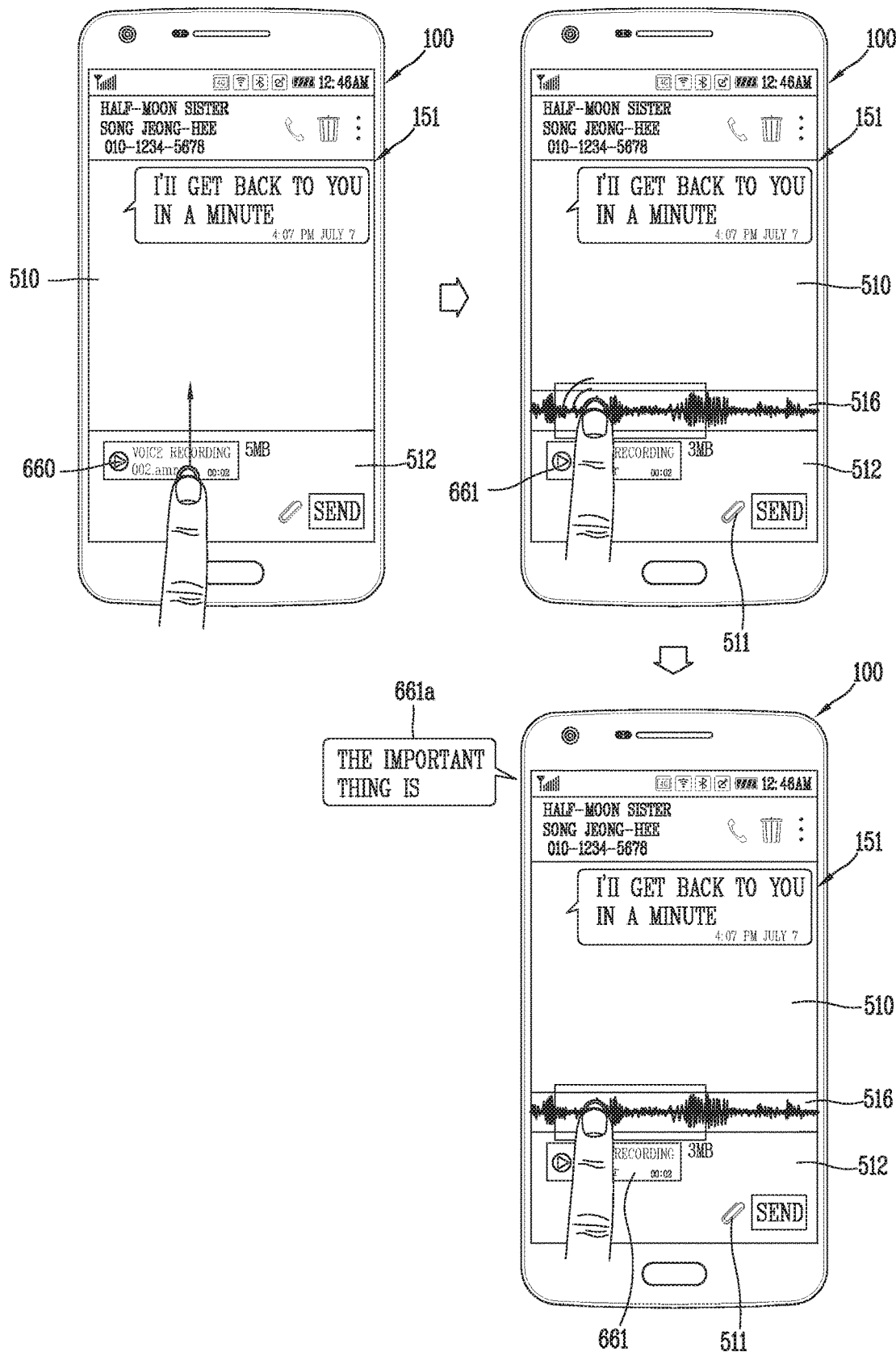
Figure 7C:
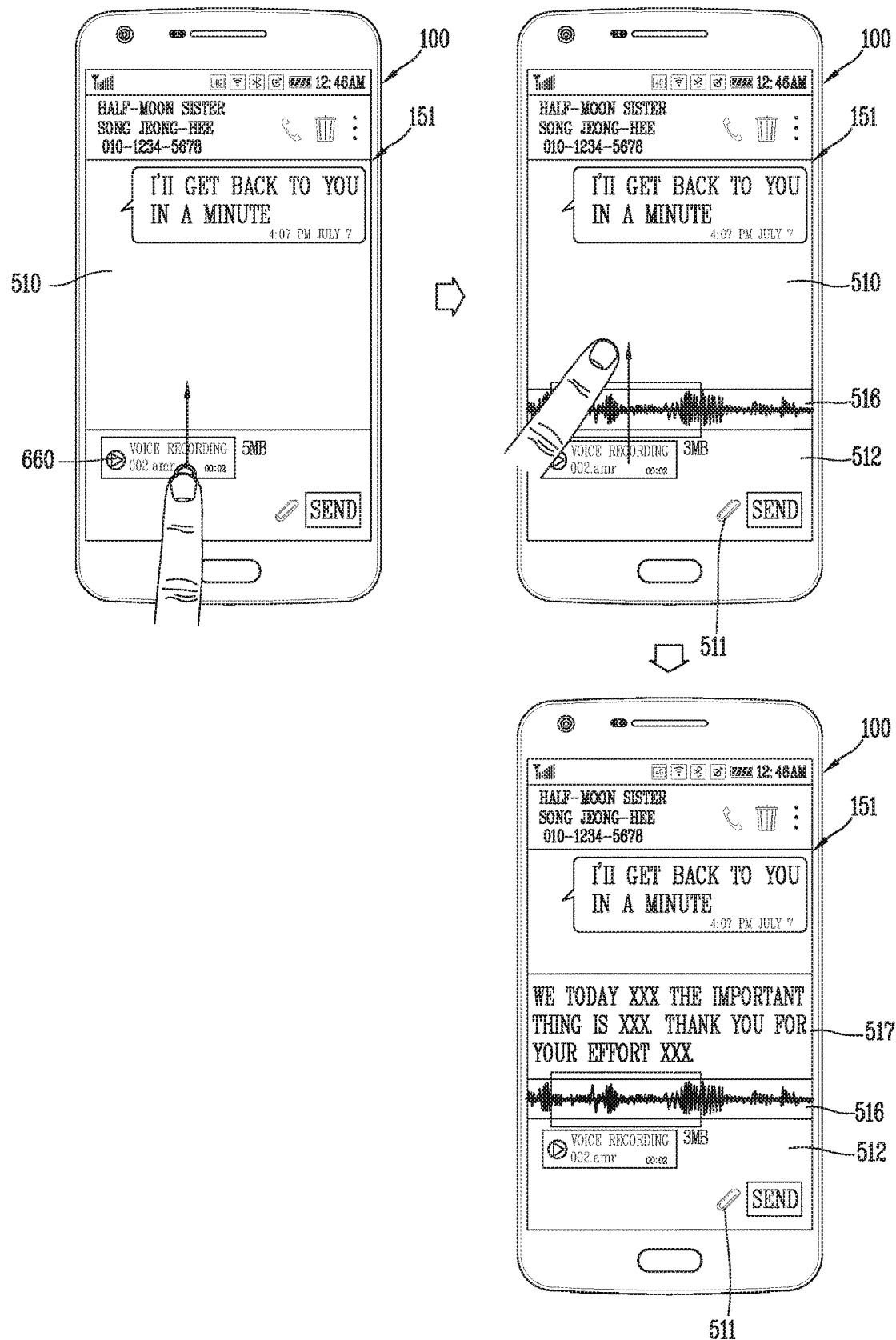

FIGS. 7A through 7C are conceptual views for explaining a control method of editing auditory content according to another embodiment.

Referring to FIG. 7A, the controller 180 controls the display unit 151 to select specific voice content 660 based on a touch applied to the graphic image 511, and display it on the data input window 512.

The controller 180 displays an output image displayed according to the passage of time of the voice content 660 on an edit region 516 based on a touch input applied to the voice content 660 displayed on the data input window 512. The edit region 516 is formed in a region adjacent to the data input window 512. A touch input applied to the voice content 660 may correspond to a consecutive touch input initially applied to the voice content 660 and released from one region of the screen information 510.

The controller 180 may edit the voice content 660 based on a touch applied to an output image displayed on the edit region 516. The controller 180 may selectively edit and form only part of a playback region of the voice content 660 based on a consecutive touch input applied to the edit region 516.

In this case, the controller 180 controls the display unit 151 to display voice information corresponding to a point at which a touch is initially applied to the image of the edit region 516 with a first text 516a. Furthermore, subsequent to applying a consecutive touch input, the controller 180 controls the display unit 151 to display voice information corresponding to a point from which the touch input is released with a second text 516b. As a result, a user may edit content while checking voice information to be played back at the start and end of the edited voice content 661.

Referring to FIG. 7B, the display unit 151 displays the output image on the edit region 516 based on a touch input applied to the voice content 660. Furthermore, the edited voice content 661 is formed based on a touch applied to the edit region 516.

The controller 180 controls the display unit 151 to display an output region corresponding to the edited voice content on the edit region 516. When the edited voice content 661 is formed, the display unit 151 may display only an output image corresponding to the edited voice content 661 on the edit region 516 or display a region corresponding to the edited voice content 661 on the entire output image.

The controller 180 controls the audio output unit 152 to play back voice corresponding to a specific point to which the touch input is applied for a preset period of time, based on a specific type of touch input (for example, long touch input) applied to an output image corresponding to the edited voice content 661.

As a result, a user may edit voice content while playing back one region of the edited voice content 661 in actuality.

Referring to FIG. 7C, the controller 180 controls display unit 151 to form the edit region 516, and display an output image on the edit region 516 based on a touch input applied to the voice content 660.

Furthermore, the controller 180 controls the display unit 151 to output voice information 519 in one region of the screen information 510 based on a touch input applied to the edit region 516. The voice information 519 corresponds to information in which voice included in the voice content 660 or edited edit voice content 661 is converted into a text.

As a result, a user may edit voice content while checking voice information included in the edited voice content.

FIGS. 8A through 8E are conceptual views for explaining a control method of selecting content to be transmitted according to still another embodiment.

Figure 8A:
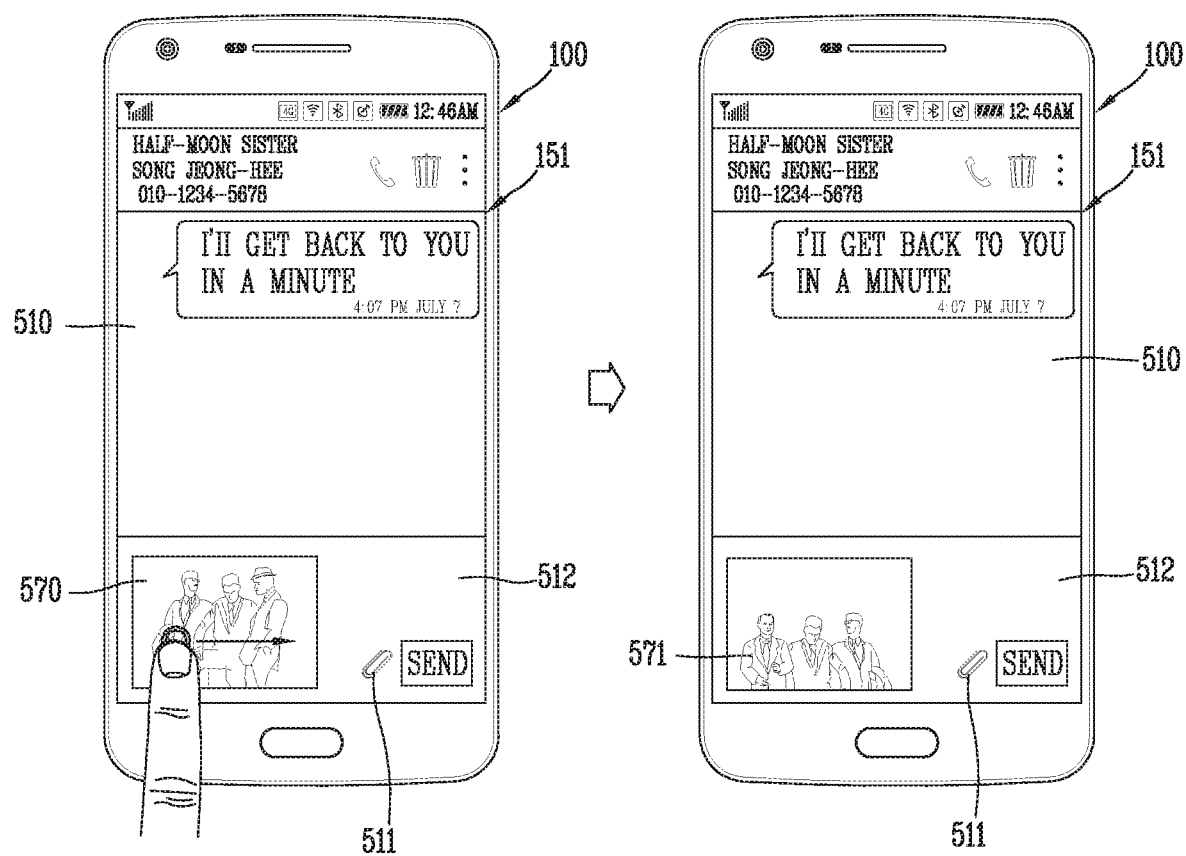
FIGS. 8A through 8E are conceptual views for explaining a control method of selecting content to be transmitted according to still another embodiment.

Referring to FIG. 8A, the display unit 151 displays the screen information 510 of an application for transmitting and receiving data, and displays selected content 570 on the data input window 512 included in the screen information 510.

The controller 180 controls the display unit 151 to display additional content 571 based on a specific type of touch input applied to the content 570. In other words, when a specific type of touch input is applied to the content 570, the controller 180 may control the display unit 151 to search additional content associated with the content 570 (for example, search additional content on the memory 170 of the mobile terminal 100 or a specific server), and display the searched additional content 571 instead of the content 570.

For example, when a figure is included in the content 570, the controller 180 selects the figure based on the first touch input (long touch input), and searches content associated with the figure based on a second touch input (dragging touch input). The display unit 151 displays the additional content 571 associated with the figure.

As a result, a user may receive additional content without executing an application for searching content associated therewith or passing through a search process.

Figure 8B:
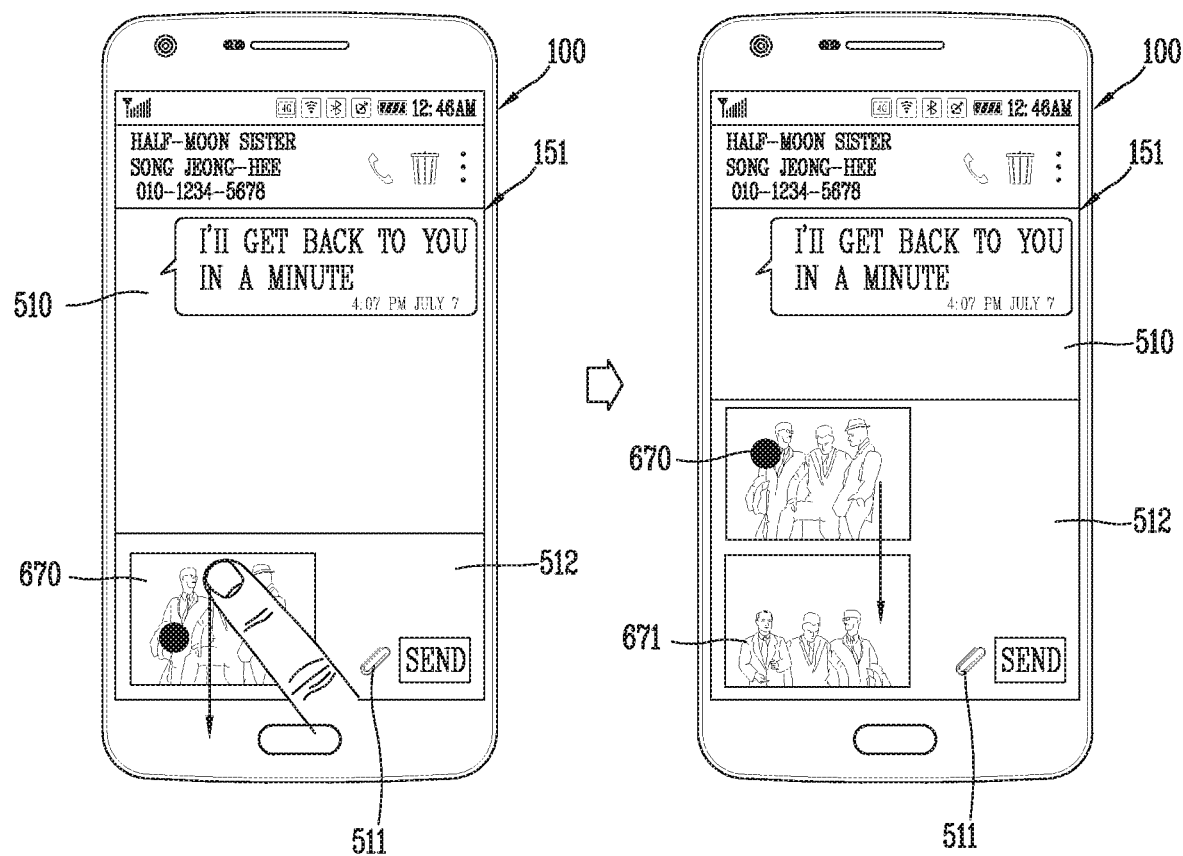

Referring to FIG. 8B, the controller 180 selects a figure included in the content 570 based on the first touch input, and searches content associated with the figure based on a third touch input (dragging touch input). The second and the third touch input may be set to have different dragging directions.

The display unit 151 may display the searched additional content 671 along with the content 670 on the data input window 5121. As a result, a user may continuously receive a plurality of content associated therewith in a state that the screen information 510 is displayed.

Figure 8C:
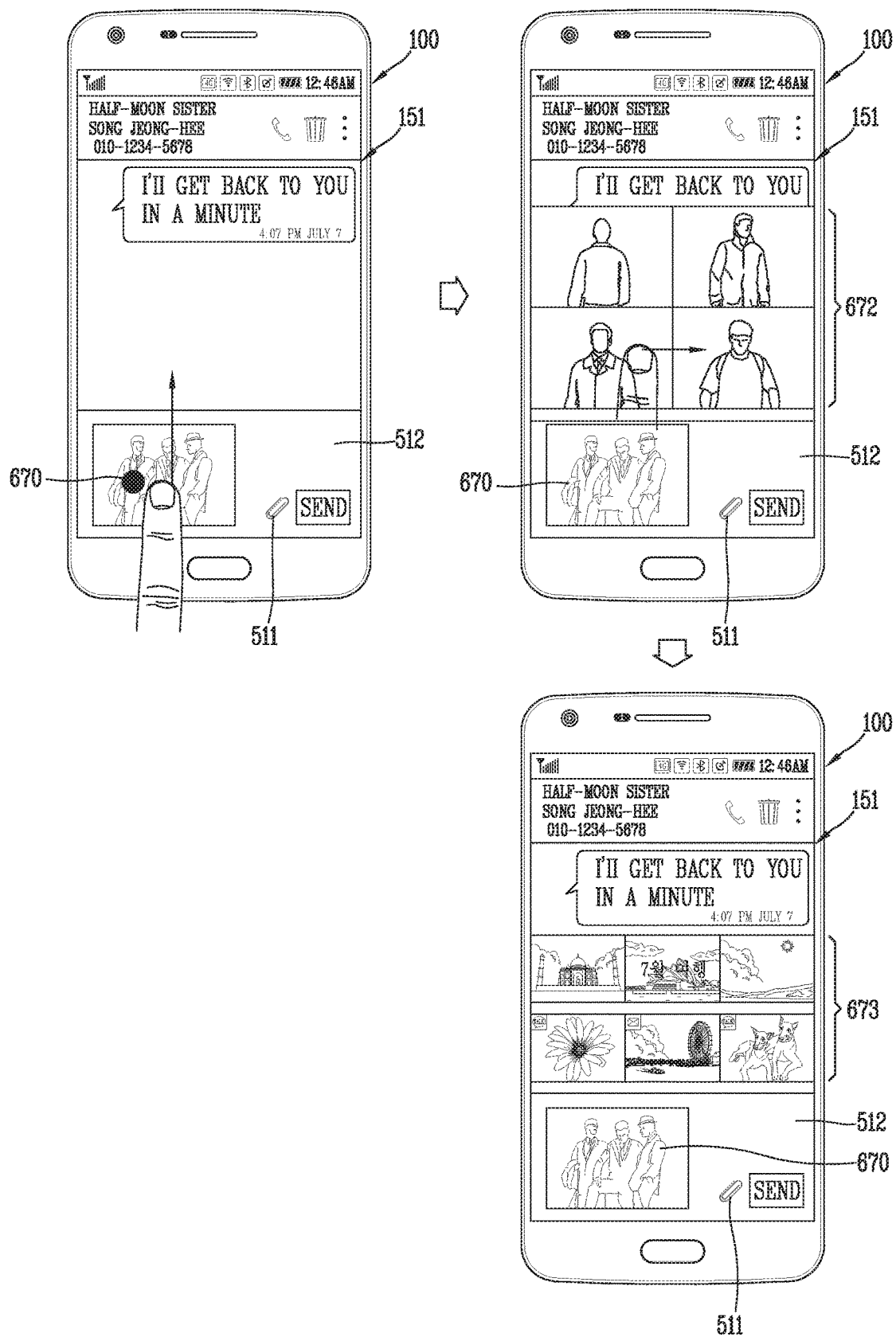

Referring to FIG. 8C, the controller 180 may receive a plurality of additional content classified into a specific category based on a specific type of touch input applied to the content 670.

For example, the controller 180 displays a first content unit 672 in one region of the screen information 510 based on a first touch input and a fourth touch input applied to the content 670. Here, the fourth touch input may correspond to a dragging type of touch input that is applied from the content 670 and moved into a region of the screen information 510.

The first content unit 672 may include content including a figure selected by the first touch input. The controller 180 may control the display unit 151 to display a second content unit 673 searched by another category (for example, searched by a date, a time, a place and the like of content at which a touch input is received) based on a specific touch input applied to the first content unit 672.

A user may receive content units classified into various categories based on a touch applied to a content unit displayed in one region of the screen information 510. Furthermore, though not shown in the drawing, the controller 180 may control the display unit 151 to display at least one additional content included in the content unit on the data input window 512.

According to the present embodiment, a user may receive a plurality of content associated with content in a state that the screen information 510 is displayed, and it is not required to have a process for repeatedly executing an application or searching content associated therewith.

Figure 8D:
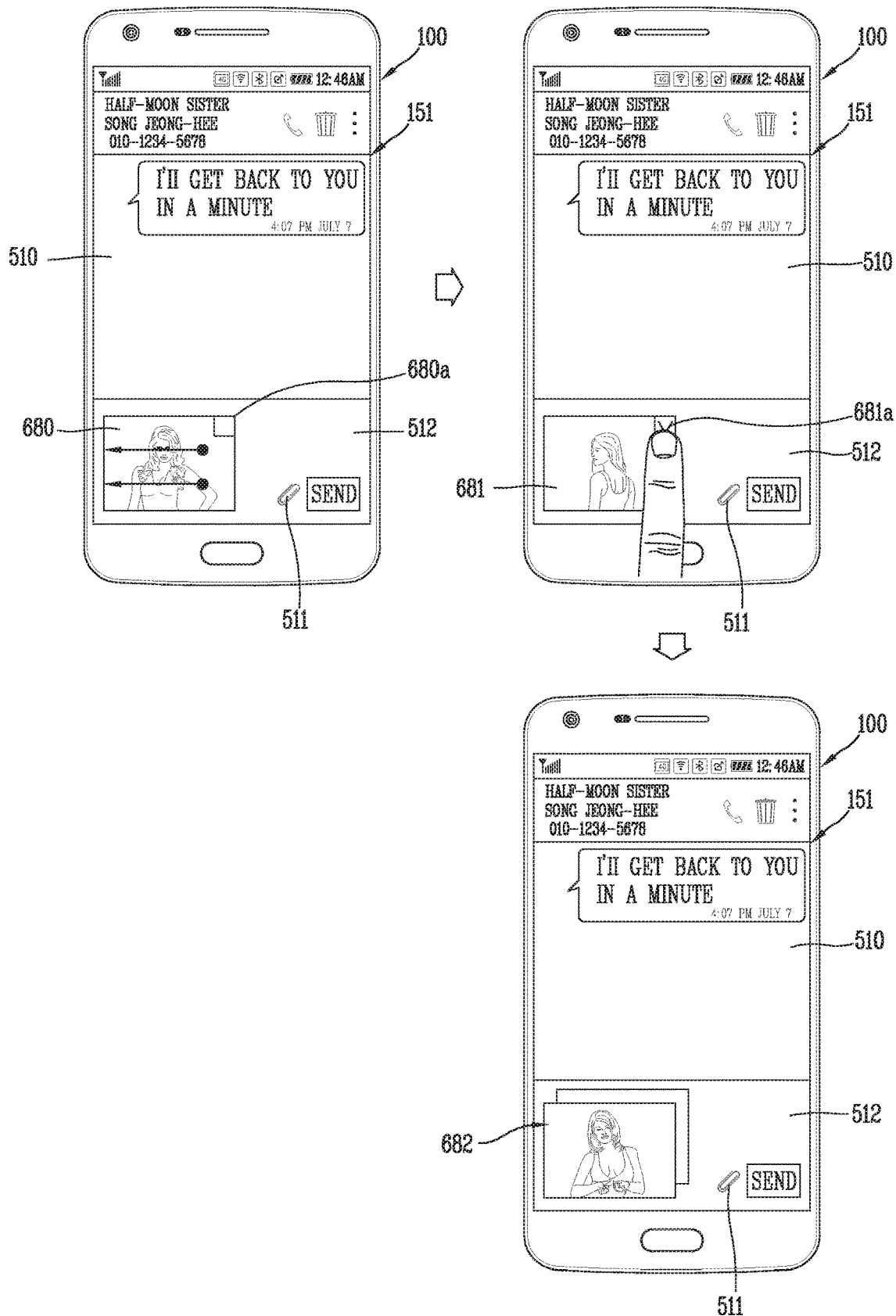

Referring to FIG. 8D, the display unit 151 displays content 680 on the data input window 512. The content 680 may correspond to an image selected by the graphic image 511.

The controller 180 controls the display unit 151 to search content associated with the content 680, and sequentially display it based on a specific type of touch input applied to the content 680. The display unit 151 sequentially displays the searched content on the data input window 512 according to the passage of time. Here, the touch input corresponds to a touch applied in a dragging manner in a state that a touch input is applied to a plurality of touch positions.

A select image 680a, 681a may be displayed on the content 680 and sequentially displayed additional content 681, 682. The controller 180 selects part of the plurality of content based on a touch applied to the select image 680a, 681a. When a plurality of content are selected, the controller 180 controls the display unit 151 to display the plurality of content in a stacked shape.

According to the present embodiment, a user may easily select and transmit at least part of sequentially provided content.

Figure 8E:
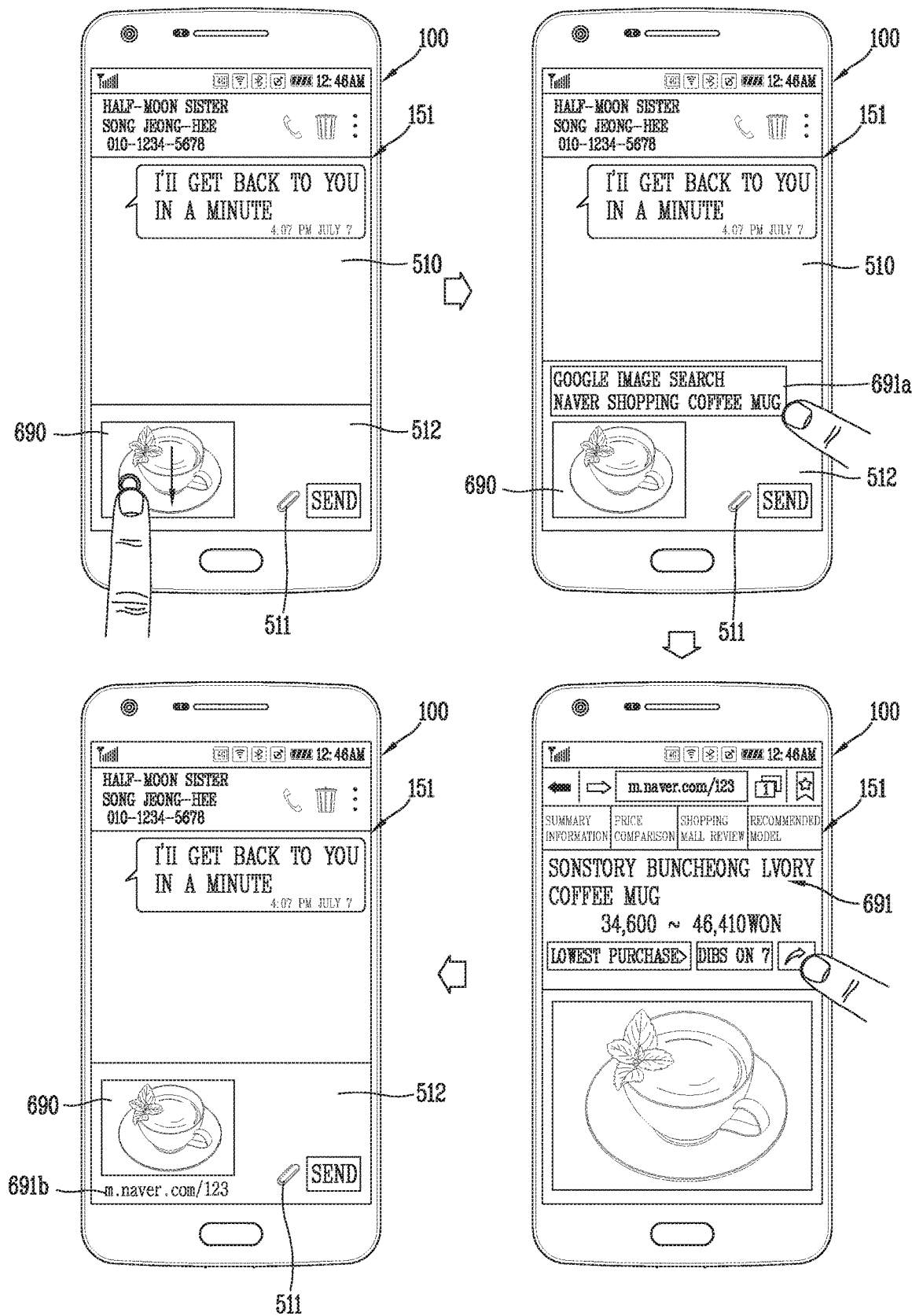

Referring to FIG. 8E, the display unit 151 displays selected content 690 on the data input window 512. The controller 180 controls the display unit 151 to search and display tagging information 691a based on a touch input applied to the content 690. The tagging information 691a may correspond to data stored in the memory 170 or data searched from a specific server.

When a touch is applied to the tagging information 691a, the controller 180 displays tagging screen information 691 associated with the tagging information 691a. The display unit 151 may switch the screen information 510 to the tagging screen information 691 by the selection of the tagging information 691a. The tagging screen information 691 may include an icon for receiving a touch input to share the tagging screen information 691.

The controller 180 controls the display unit 151 to display the address information of the tagging screen information 691 along with the content 690 on the data input window 512 based on a touch applied to the icon. In other words, a user may transmit content and tagging screen information associated therewith to an external device. The tagging screen information may correspond to a source of content or correspond to information associated therewith stored by the user. Accordingly, the user may more easily transmit address information to an external device without separately writing it or copying it to an execution screen of another application.

FIG. 9A through 9E are conceptual views for explaining a control method of transmitting selected content to an external device according to yet still another embodiment.

Figure 9A:
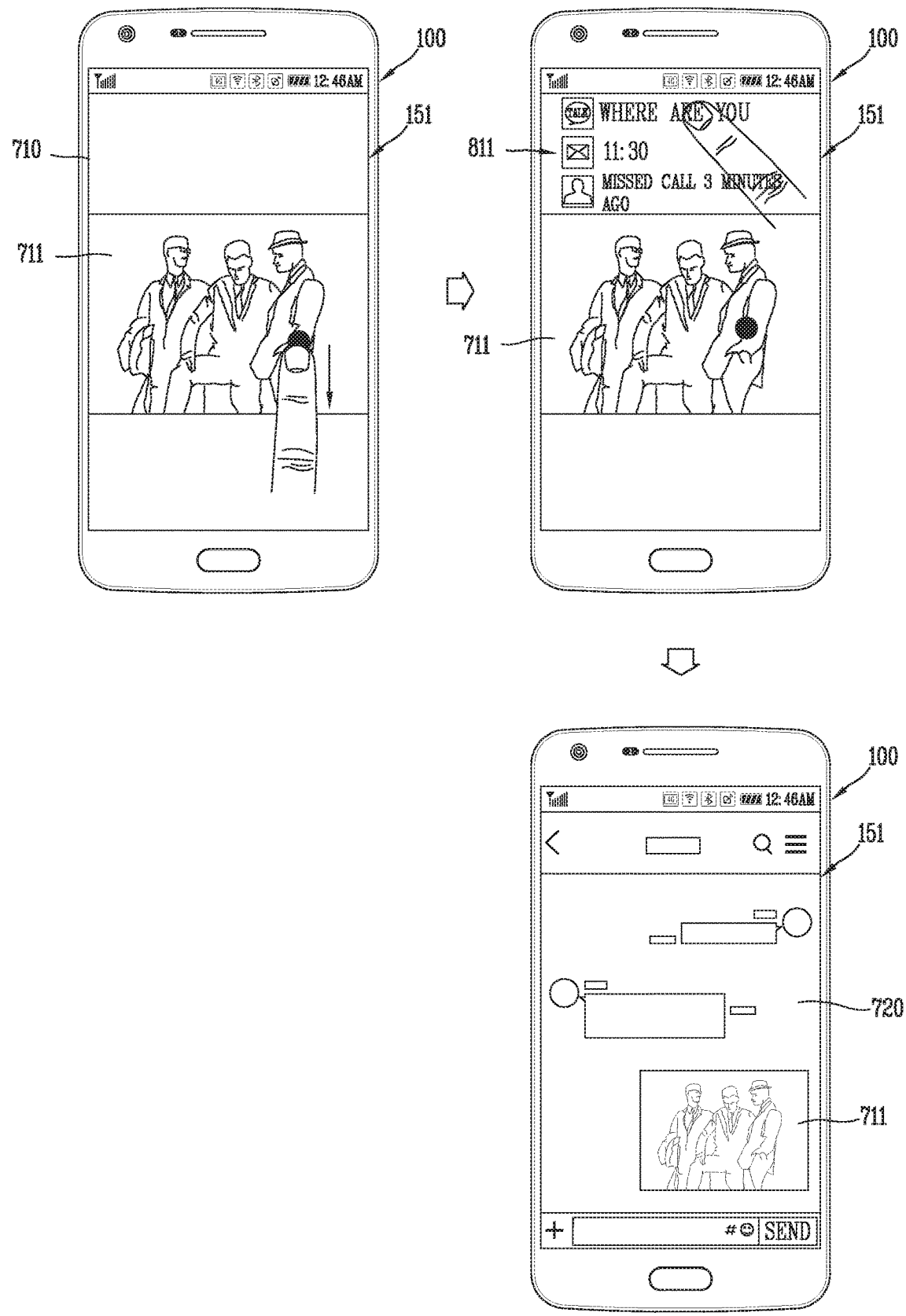
FIG. 9A through 9E are conceptual views for explaining a control method of transmitting selected content to an external device according to yet still another embodiment.

Referring to FIG. 9A, the display unit 151 displays screen information 710 including content 711 based on a specific control command. The screen information 710 may correspond to an execution screen of an application that provides the content 711. The controller 180 may select partial information included in the content 711 based on a touch input applied to the content 711. For example, when a figure is included in the content 711, the controller 180 may select a figure based on a touch input.

The controller 180 controls the display unit 151 to display application information 811 associated with the information of the selected figure. The application information 811 may include information associated with the selected figure among the data of each application. Specifically, the application information 811 may correspond to an icon of each application and transmitted and received wireless data.

The controller 180 controls the display unit 151 to display an execution screen 720 of the relevant application based on a touch applied to the application information 811. The execution screen 720 may be formed with a screen associated with the information of the selected figure. In other words, the execution screen 720 may include data transmitted to and received from an external device of the figure.

Furthermore, the controller 180 controls the wireless communication unit 110 to immediately transmit the content to the external device of the figure. Accordingly, a message indicating that the content 711 has been transmitted to the external device is displayed on the execution screen 720.

As a result, a user may more easily transmit content to an external device using information included in the content on an execution screen of an application associated with the content.

Figure 9B:
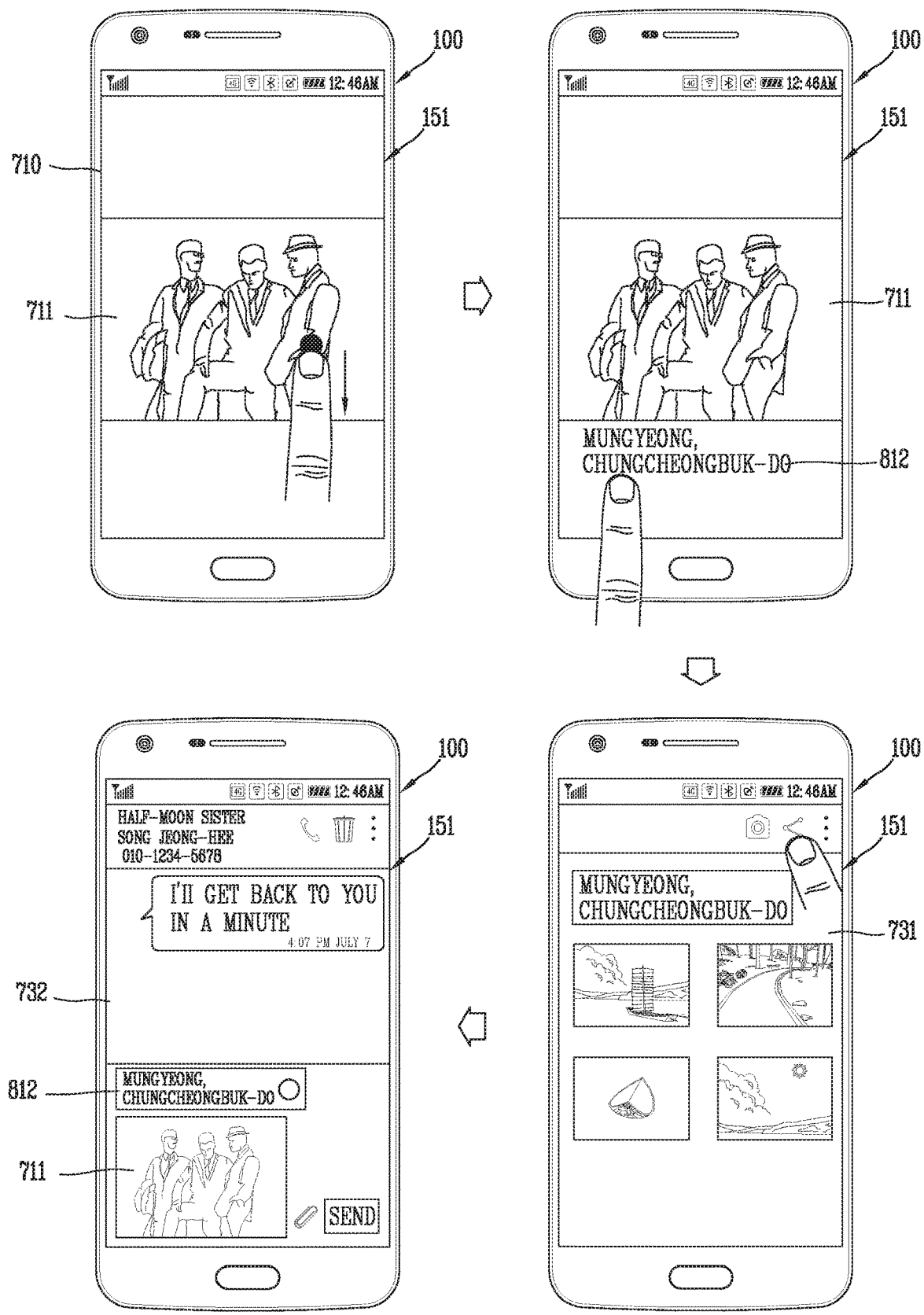

Referring to FIG. 9B, the controller 180 controls the display unit 151 to extract tagging information 812 associated with the content 711 and display it based on a specific type of touch input applied to the content 711.

The controller 180 controls the display unit 151 to search additional content 731 associated with the tagging information 812 and display it based on a touch applied to the tagging information 812. For example, when the content 711 is a captured image, and the tagging information 812 corresponds to a region in which the image has been captured, the controller 180 extracts additional content associated with the captured region.

The controller 180 displays the tagging information 812 and the content 711 on an execution screen 732 of a data transmission application to transmit them based on a touch input applied to a shared icon displayed along with the content and the additional content. In other words, it is not required for a user to have a process of additionally entering or copying to transmit content and tagging information at the same time.

Figure 9C:
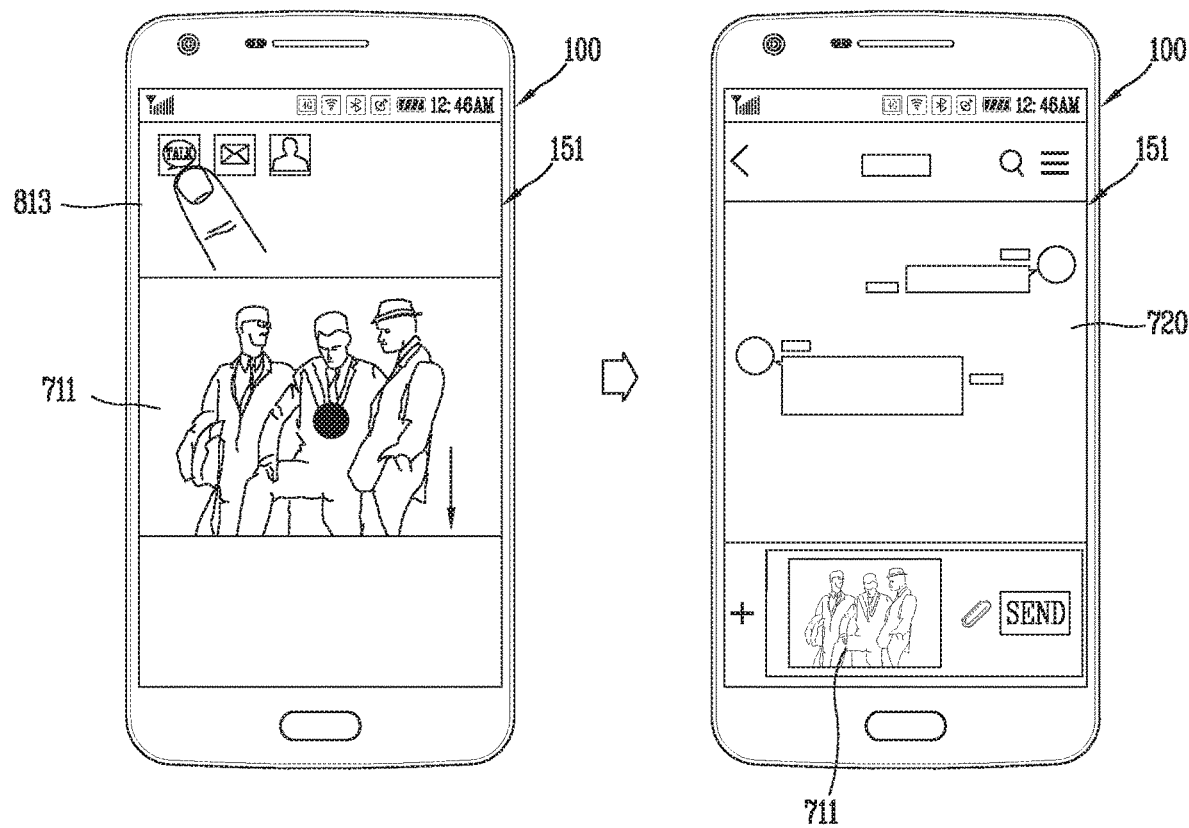

Referring to FIG. 9C, the controller 180 may select specific information included in the content 711 based on a touch input applied to the content 711. For example, the specific information may correspond to figure information.

The controller 180 displays an icon 813 corresponding to an application for transmitting data after the selected specific figure information is selected. When a touch is applied to the icon 813, the application is carried out, and an execution screen 720 for the application is displayed.

The execution screen 720 may correspond to screen information that performs wireless communication with an external device of the selected figure information. Furthermore, the display unit 151 displays the content 711 on the execution screen 720. The content 711 may correspond to a state that has been previously transmitted to the external device or correspond to a state of waiting for transmission.

Figure 9D:
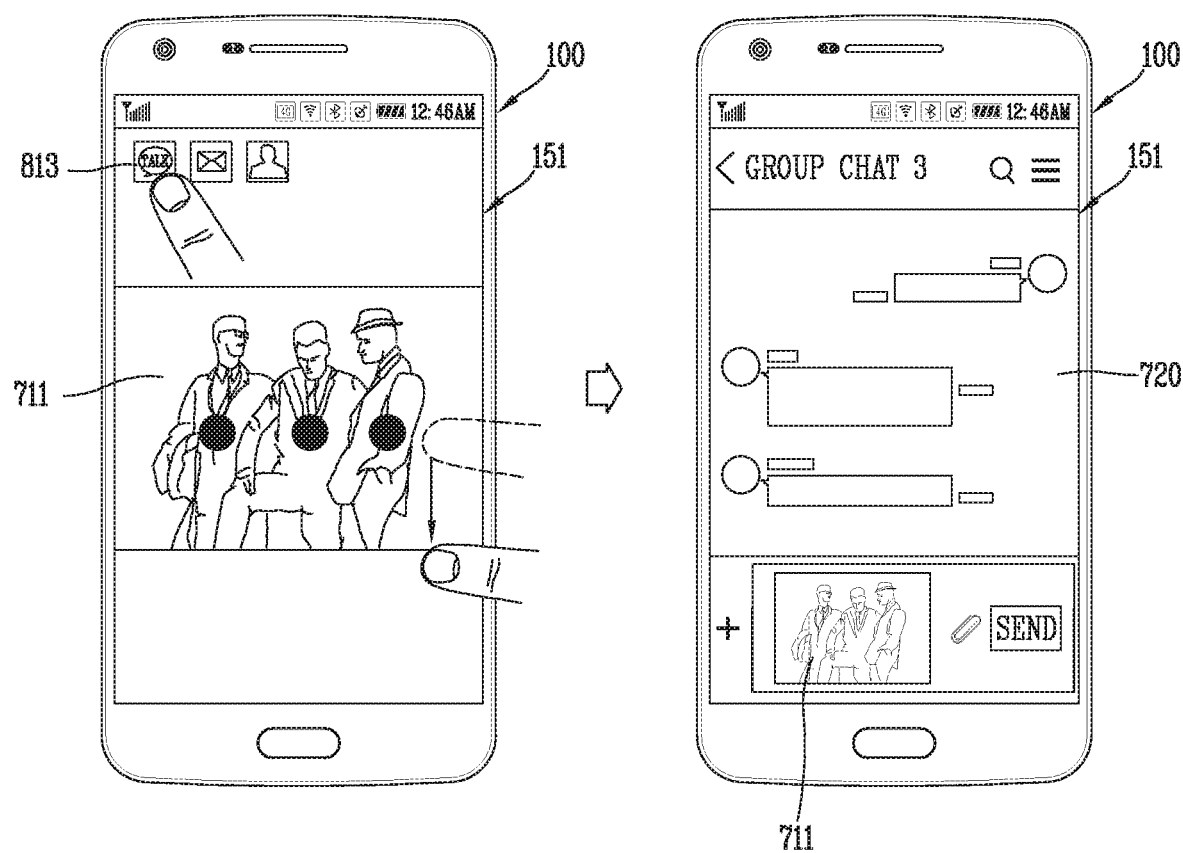

Referring to FIG. 9D, the controller 180 may control a function of the selected application based on figure information selected by the content 711. The controller 180 selects a plurality of figure information included in the content 711, and selects one of applications for transmitting data. The controller 180 executes the selected application, and display the execution screen 720 indicating wireless communication with an external device of the plurality of figure information, respectively, based on a specific type of touch input applied to the content 711. In other words, the external devices of the plurality of figure information and the mobile terminal may be formed on a group chatting window for transmitting and receiving data to and from each other.

According to the present embodiment, when information associated with a provided in external devices are included in content, a user may share the content at once using one selected application without any complicated process of individually transmitting the content to each external device.

Figure 9E:
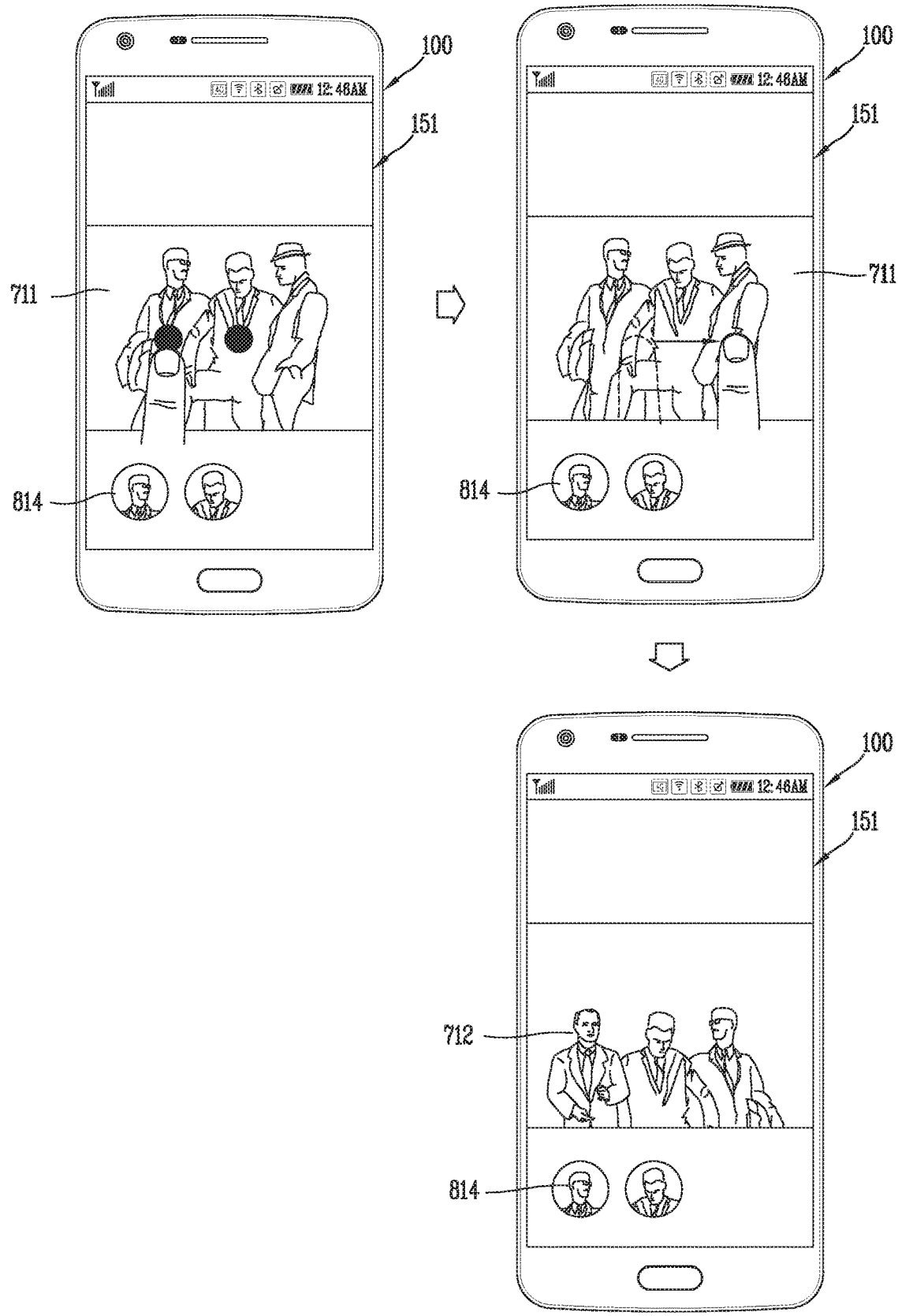

Referring to FIG. 9E, the controller 180 controls the display unit 151 to display an icon 814 corresponding to information on a specific figure based on a specific type of fifth touch input (for example, long touch input) applied to the content 711. A user may know information selected from information included in the content 711 by the icon 814. For example, the icon 814 may be formed as a representative image of an external device matching a figure stored in and selected from the memory 170.

In a state that the icon 814 is displayed, the controller 180 controls the display unit 151 to extract additional content 712 associated with the selected figure information, and display it based on a sixth touch input (for example, a dragging type of touch input) applied to the content 711.

As a result, a user may receive content associated with a plurality of figures without any additional process.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
    a wireless communication unit configured to perform wireless communication with an external device;
    a display unit configured to display a data input window for entering one or more files to be transmitted to the external device and screen information including a graphic image for selecting the one or more files; and
    a controller configured to:
    in response to a first input being applied to the graphic image, select the one or more files and cause the display unit to display one or more thumbnail images, each thumbnail image corresponding to one of the one or more files;
    determine whether a type of a first file and a type of a second file area same type in response to a second input for merging a thumbnail image corresponding to the first file into a thumbnail image corresponding to the second file;
    merge the thumbnail image corresponding to the first file into an area extending from the displayed thumbnail image corresponding to the second file when the type of the first file is the same type as the type of the second file; and
    merge the thumbnail image corresponding to the first file into the thumbnail image corresponding to the second file by overlapping the thumbnail image corresponding to the first file on at least part of the thumbnail image corresponding to the second file when the type of the first file is not the same type as the type of the second file.

2. The mobile terminal of claim 1, wherein the one or more thumbnails are displayed on the data input window, and
    wherein merge content generated by merging the thumbnail image corresponding to the first file into the thumbnail image corresponding to the second file is displayed on the data input window.

3. The mobile terminal of claim 2, wherein each of the first file and the second file is an image, and the merge content corresponds to images disposed adjacent to each other.

4. The mobile terminal of claim 2, wherein each of the first file and the second file is an image, and the merge content is formed with a playback file configured to be played back according to passage of time.

5. The mobile terminal of claim 1, wherein the controller is further configured to:
    in response to a third input being applied to a graphic object image corresponding to the second file, cause the display unit to display the thumbnail image corresponding to the second file on the data input window; and
    merge the thumbnail image corresponding to the first file into the thumbnail image corresponding to the second file by forming a handwriting image on the thumbnail image corresponding to the second file based on a specific type of touch applied to the thumbnail image corresponding to the second file.

6. The mobile terminal of claim 1, wherein the controller is further configured to:
    cause the display unit to display a virtual keyboard capable of entering a text based on a touch applied to the data input window; and
    when the thumbnail image corresponding to the second file is displayed on the data input window based on a touch applied to a graphic image corresponding to the second file, merge the thumbnail image corresponding to the first file into the thumbnail image corresponding to the second file by displaying the thumbnail image corresponding to the first file in a text format based on a touch applied to the virtual keyboard on the thumbnail image corresponding to the second file.

7. The mobile terminal of claim 1, wherein the controller is further configured to:
    when the second file is selected based on a touch applied to a graphic image corresponding to the second file, edit the second file based on a touch input.

8. The mobile terminal of claim 7, wherein the controller is further configured to:
    when the second file corresponds to a video file consisting of plurality of images, cause the display unit to display the plurality of images in a first edit region; and
    form edit content consisting of at least part of the plurality of images based on a touch applied to the plurality of images displayed in the first edit region.

9. The mobile terminal of claim 8, wherein the controller is further configured to:

form a second edit region larger than the first edit region in one region on the screen information based on a specific type of touch input applied to the first edit region; and cause the display unit to display the plurality of images on the second edit region.

10. The mobile terminal of claim 7, wherein the controller is further configured to:

when the second file corresponds to auditory data outputted according to passage of time, cause the display unit to display an image corresponding to the auditory data on the first edit region; and form edit content in which the auditory data is edited based on a touch applied to the first edit region.

11. The mobile terminal of claim 10, wherein the controller is further configured to:

when the auditory data corresponds to voice information, cause the display unit to display a text indicating the voice information of the relevant auditory data based on a touch applied to the image.

12. The mobile terminal of claim 11, wherein the controller is further configured to cause the display unit to display a text indicating the voice information of the auditory data in one region of the screen information based on a touch applied to the first edit region.

13. The mobile terminal of claim 7, wherein the controller is further configured to change the screen information to sequentially display data transmitted and received through the wireless communication unit;

cause the display unit to display a control image in one region of the screen information when the screen information is changed while editing the second file; and cause the display unit to redisplay screen information prior to being modified based on a touch applied to the control image.

14. The mobile terminal of claim 1, wherein the controller is further configured to:

in a state that one file is displayed on the display unit, extract additional file associated with specific information among the one file based on a touch input applied to the one file; and cause the display unit to display the additional file.

15. The mobile terminal of claim 14, wherein when the one file corresponds to an image, the specific information corresponds to figure information.

16. The mobile terminal of claim 14, wherein the controller is further configured to cause the display unit to display application information associated with the specific information.

17. A method for merging files at a mobile terminal, the method comprising:

displaying a data input window for entering one or more files to be transmitted to an external device and screen information including a graphic image for selecting the one or more files;

in response to a first input being applied tothe graphic image, selecting the one or more files and displaying one or more thumbnail images, each thumbnail image corresponding to one of the one or more files;

determining whether a type of a first file and a type of a second file are a same type in response to a second input for merging a thumbnail image corresponding to the first file into a thumbnail image corresponding to the second file;

merging the thumbnail image corresponding to the first file into an area extending from the thumbnail image corresponding to the second file when the type of the first file is the same type as the type of the second file; and merging the thumbnail image corresponding to the first file into the thumbnail image corresponding to the second file by overlapping the thumbnail image corresponding to the first file on at least part of the thumbnail image corresponding to the second file when the type of the first file is not the same type as the type of the second file.

18. The method of claim 17, further comprising:

when the second file corresponds to a video file consisting of plurality of images, displaying the plurality of images in a first edit region;

forming edit content consisting of at least part of the plurality of images based on a touch applied to the plurality of images displayed in the first edit region;

forming a second edit region larger than the first edit region in one region on the screen information based on a specific type of a touch input applied to the first edit region; and displaying the plurality of images on the second edit region when a third input is applied to the second file, applying a touch to the second file to form an edit region; and forming an edit file in which the second file is edited based on a touch input applied to the edit region.

* * * * *